United States Patent
Lee et al.

(10) Patent No.: US 10,331,258 B2
(45) Date of Patent: Jun. 25, 2019

(54) MOBILE TERMINAL

(71) Applicant: LG ELECTRONICS INC., Seoul (KR)

(72) Inventors: Jonghwan Lee, Seoul (KR); Seongwoo Choi, Seoul (KR); Taewha Choi, Seoul (KR); Juhun Lee, Seoul (KR); Sanghyun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 15/212,445

(22) Filed: Jul. 18, 2016

(65) Prior Publication Data

US 2017/0212628 A1     Jul. 27, 2017

(30) Foreign Application Priority Data

Jan. 22, 2016  (KR) .................. 10-2016-0008319

(51) Int. Cl.
| | |
|---|---|
| *H04M 1/00* | (2006.01) |
| *G06F 3/041* | (2006.01) |
| *H04N 5/225* | (2006.01) |
| *G06F 3/0481* | (2013.01) |
| *G06F 3/0488* | (2013.01) |
| *H04N 5/232* | (2006.01) |

(52) U.S. Cl.
CPC .......... *G06F 3/0416* (2013.01); *G06F 3/0412* (2013.01); *G06F 3/04817* (2013.01); *G06F 3/04886* (2013.01); *H04N 5/2252* (2013.01); *H04N 5/2257* (2013.01); *H04N 5/23216* (2013.01); *H04N 5/23293* (2013.01)

(58) Field of Classification Search
CPC .. G06F 3/0416; G06F 3/0412; G06F 3/04817; H04N 5/2252; H04N 5/2257; H04N 5/232116; H04N 5/23293
USPC ... 455/575.4, 575.1, 575.3, 575.8, 90.3, 566
See application file for complete search history.

(56) References Cited

U.S. PATENT DOCUMENTS

| | | | | |
|---|---|---|---|---|
| 7,212,845 | B2 * | 5/2007 | Ikeuchi ............... | H04M 1/0214 379/433.04 |
| 7,647,079 | B2 * | 1/2010 | Zuo ..................... | H01M 2/1066 455/550.1 |
| 7,801,557 | B2 * | 9/2010 | Lee ...................... | H04M 1/725 370/338 |
| 8,164,885 | B2 * | 4/2012 | Lu ....................... | H01M 2/1055 361/679.01 |

(Continued)

FOREIGN PATENT DOCUMENTS

| | | |
|---|---|---|
| KR | 10-2009-0034142 A | 4/2009 |
| KR | 10-2010-0087596 A | 8/2010 |

(Continued)

*Primary Examiner* — Marceau Milord
(74) *Attorney, Agent, or Firm* — Birch, Stewart, Kolasch & Birch, LLP

(57) ABSTRACT

A mobile terminal is disclosed. The mobile terminal includes a first body having a front surface, on which a display is positioned, one end of the first body being opened, and a second body coupled with the first body by a plurality of couplers provided at different positions. At least one of the plurality of couplers is a magnet coupler coupling the first and second bodies through a magnetic force. At least another of the plurality of couplers is a hook coupler provided corresponding to the first and second bodies.

18 Claims, 26 Drawing Sheets

(56) References Cited

U.S. PATENT DOCUMENTS

| | | | | |
|---|---|---|---|---|
| 8,200,294 B2* | 6/2012 | Endo | ............... | G06F 1/1616 |
| | | | | 455/575.1 |
| 8,437,814 B2* | 5/2013 | Lee | ............... | G03B 17/02 |
| | | | | 206/703 |
| 8,588,872 B2* | 11/2013 | Honma | ............... | H04M 1/0214 |
| | | | | 455/575.1 |
| 8,588,874 B2* | 11/2013 | Sato | ............... | H04M 1/0237 |
| | | | | 455/347 |
| 8,594,753 B2* | 11/2013 | Makino | ............... | H04M 1/0216 |
| | | | | 361/679.06 |
| 8,855,728 B2* | 10/2014 | Ogatsu | ............... | H04M 1/0237 |
| | | | | 455/550.1 |
| 9,064,643 B2* | 6/2015 | Park | ............... | H04M 1/22 |
| 9,131,300 B2* | 9/2015 | Horii | ............... | H04M 1/026 |
| 9,182,842 B2* | 11/2015 | Cho | ............... | G06F 1/1671 |
| 9,258,393 B2* | 2/2016 | Park | ............... | H04M 1/0206 |
| 9,420,735 B2* | 8/2016 | Katayama | ............... | H04M 1/0202 |
| 9,513,668 B2* | 12/2016 | Shin | ............... | G06F 3/041 |
| 9,619,028 B2* | 4/2017 | Horii | ............... | H04M 1/026 |
| 9,629,268 B2* | 4/2017 | Lee | ............... | H05K 5/0247 |
| 9,876,893 B2* | 1/2018 | Yoo | ............... | H04M 1/7253 |
| 9,949,597 B2* | 4/2018 | Tsibulevskiy | ............... | A47K 3/281 |
| 9,955,825 B2* | 5/2018 | Tsibulevskiy | ............... | A47K 3/281 |
| 2004/0053649 A1* | 3/2004 | Sun | ............... | H04M 1/0249 |
| | | | | 455/575.1 |
| 2010/0208434 A1 | 8/2010 | Kim et al. | | |
| 2011/0096513 A1 | 4/2011 | Kim | | |
| 2011/0165916 A1* | 7/2011 | Park | ............... | H01Q 1/06 |
| | | | | 455/566 |
| 2012/0026656 A1* | 2/2012 | Lee | ............... | H01M 2/1066 |
| | | | | 361/679.01 |
| 2012/0071211 A1* | 3/2012 | Yokota | ............... | H04M 1/0237 |
| | | | | 455/566 |
| 2014/0125528 A1* | 5/2014 | Tsai | ............... | H01Q 13/106 |
| | | | | 343/702 |
| 2014/0125612 A1 | 5/2014 | Park et al. | | |
| 2014/0187289 A1 | 7/2014 | Cataldo et al. | | |
| 2015/0156898 A1 | 6/2015 | Shin et al. | | |

FOREIGN PATENT DOCUMENTS

| | | |
|---|---|---|
| KR | 10-2010-0094076 A | 8/2010 |
| KR | 10-2010-0116378 A | 11/2010 |
| KR | 10-2011-0044620 A | 4/2011 |
| KR | 10-2012-0010922 A | 2/2012 |
| KR | 10-2014-0057017 A | 5/2014 |
| KR | 10-2015-0064955 A | 6/2015 |

* cited by examiner

FIG. 7
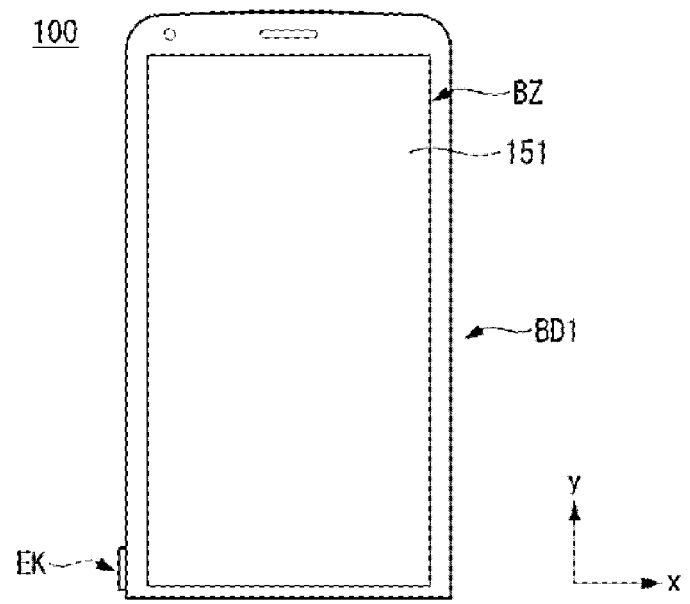
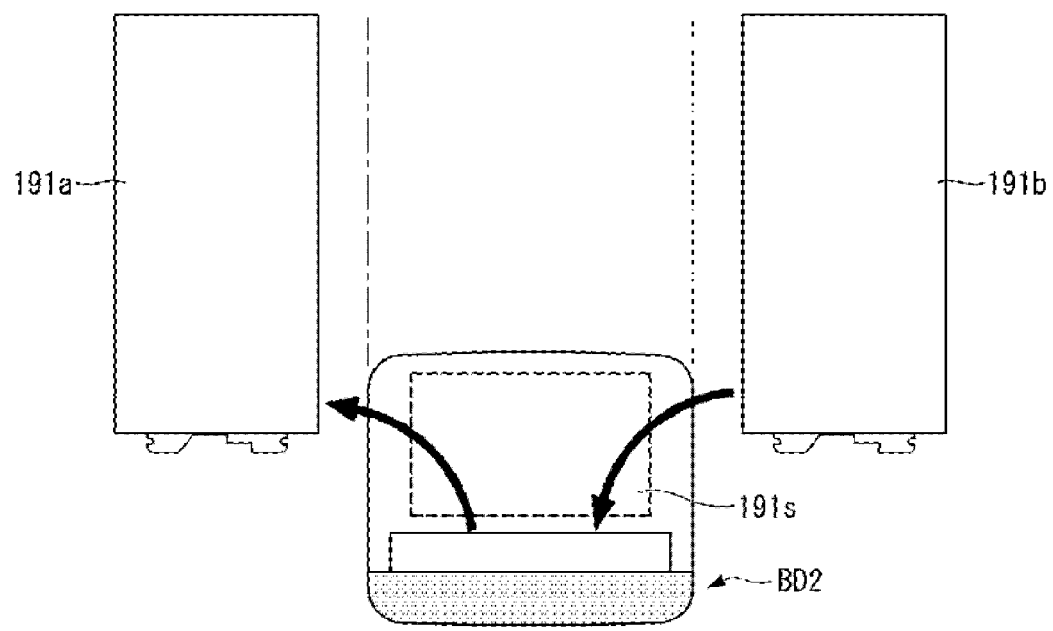

FIG. 15

| First and second bodies | First status | Second status | Third status |
|---|---|---|---|
| Connection status | Full coupling | Semi-coupling | Separation |
| Fastening status | Electrical connection | Electrical connection | Disconnection |
| | First locking module :Fastening | First locking module :Release | First locking module :Release |
| | Second locking module :Fastening | Second locking module :Fastening | Second locking module :Release |

FIG. 18
(a) 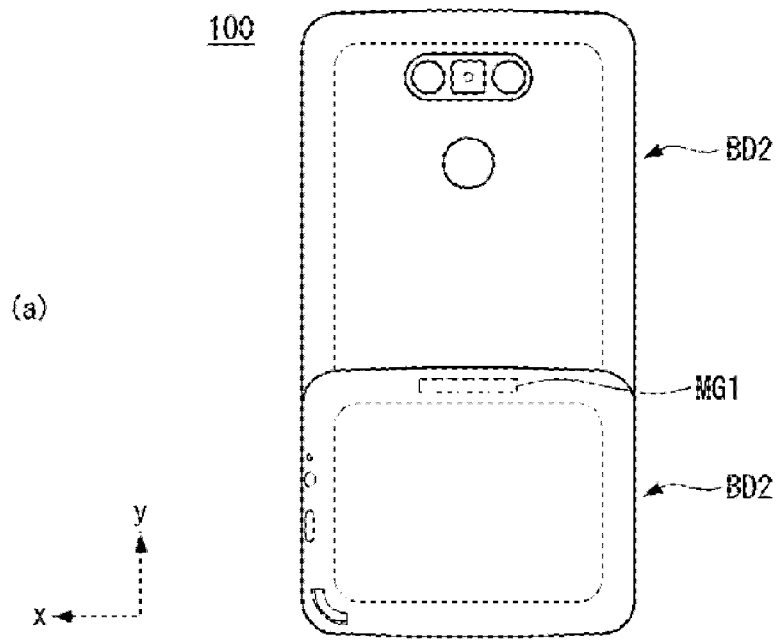
(b) 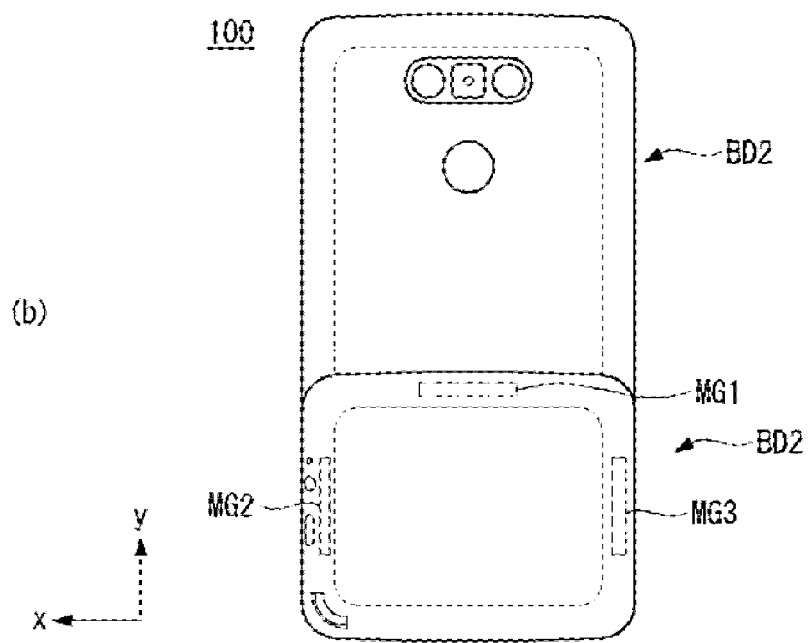

MOBILE TERMINAL

This application claims the benefit of Korean Patent Application No. 10-2016-0008319 filed on Jan. 22, 2016, the entire contents of which are incorporated herein by reference for all purposes as if fully set forth herein.

BACKGROUND OF THE INVENTION

Field of the Invention

The present disclosure relates to a mobile terminal. More particularly, the present disclosure relates to a mobile terminal, in which a coupling status of first and second bodies can be changed by a magnet coupler and a hook coupler.

Discussion of the Related Art

Terminals may be generally classified into mobile/portable terminals and stationary terminals based on a mobility. The mobile terminals may also be classified into handheld terminals and vehicle mounted terminals depending on whether or not a user can directly carry the terminal.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc. Efforts are ongoing to support and increase the functionality of the mobile terminals.

Such efforts include software and hardware improvements, as well as changes and improvements in the structural components.

SUMMARY OF THE INVENTION

In one aspect, there is provided a mobile terminal comprising a first body having a front surface, on which a display is positioned, one end of the first body being opened, and a second body coupled with the first body by a plurality of couplers provided at different positions, wherein at least one of the plurality of couplers is a magnet coupler coupling the first and second bodies through a magnetic force, and wherein at least another of the plurality of couplers is a hook coupler provided corresponding to the first and second bodies.

The first and second bodies may be in one status of a first status in which the second body is coupled with an end of the first body, a second status in which a portion of the second body is separated from the first body, and a third status in which an entire portion of the second body is separated from the end of the first body. The magnet coupler may be attached to a back surface of the first body through the magnetic force in the first status.

The second body may include a second body inner part inserted into the first body through the end of the first body and a second back cover extended from the second body inner part toward a back surface of the first body.

The magnet coupler may be positioned in at least a portion of the second back cover.

The magnet coupler may be positioned at an end of the second back cover.

The magnet coupler may include a first magnet and a second magnet having a polarity different from a polarity of the first magnet, and the first and second magnets may be arranged side by side.

The second body may be coupled with a plurality of members. The plurality of members may include a first member coupled with the second body inner part and a second member coupled with the second back cover.

The first and second members may be respectively first and second batteries that are separated from each other.

When the first body is in a first status in which the second body is coupled with the first body, the first body may include a magnetic connector of a metal material in an area corresponding to the magnet coupler so that a coupling force is generated by the magnetic force of the magnet coupler.

The second body may include at least one of a speaker module, an USB module, a plurality of buttons obtaining a push input, and an antenna pattern provided at a location separated from the first body.

At least a portion of a back surface of the first body may be formed of a metal material formed as one body together with the first body.

In another aspect, there is provided a mobile terminal comprising a first body having a front surface, on which a display is positioned, one end of the first body being opened, a second body coupled with the first body through a plurality of couplers provided at different positions, and a controller configured to deactivate a response to a touch input received from at least a portion of the display when a mode corresponding to a coupling status of the first body and the second body is activated.

When the touch input includes at least one of a touch equal to or greater than a determined area, a touch equal to or greater than a determined time, and a touch of at least a determined portion of the display, the controller may be configured to deactivate the response to the user's touch input.

The at least the portion of the display may be an area of the display contacted by a user's finger holding the second body when the mobile terminal is in a landscape mode.

The at least the portion of the display may include at least one of a left side and a right side of the display.

The controller may be configured to distinguishably display the at least the portion of the display and a remaining portion of the display except the at least the portion of the display.

The controller may be configured to display a plurality of icons receiving the touch input on the display. When the response to the at least the portion of the display is deactivated, the controller may be configured to remove an appearance of at least one icon displayed on the at least the portion of the display among the plurality of icons.

The controller may be configured to change a location and an area of the at least the portion of the display in accordance with an input received from the user.

The controller may be configured to deactivate the response when the second body is coupled with the first body.

The predetermined mode may be a camera shooting mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5 to 7 illustrate an operation of a mobile terminal shown in FIG. 1;

FIG. 15 illustrates a status of a mobile terminal according to an embodiment of the invention;

FIG. 18 illustrates various examples of a disposition of a magnet coupler shown in FIG. 16;

DETAILED DESCRIPTION OF THE EMBODIMENTS

Figure 1:
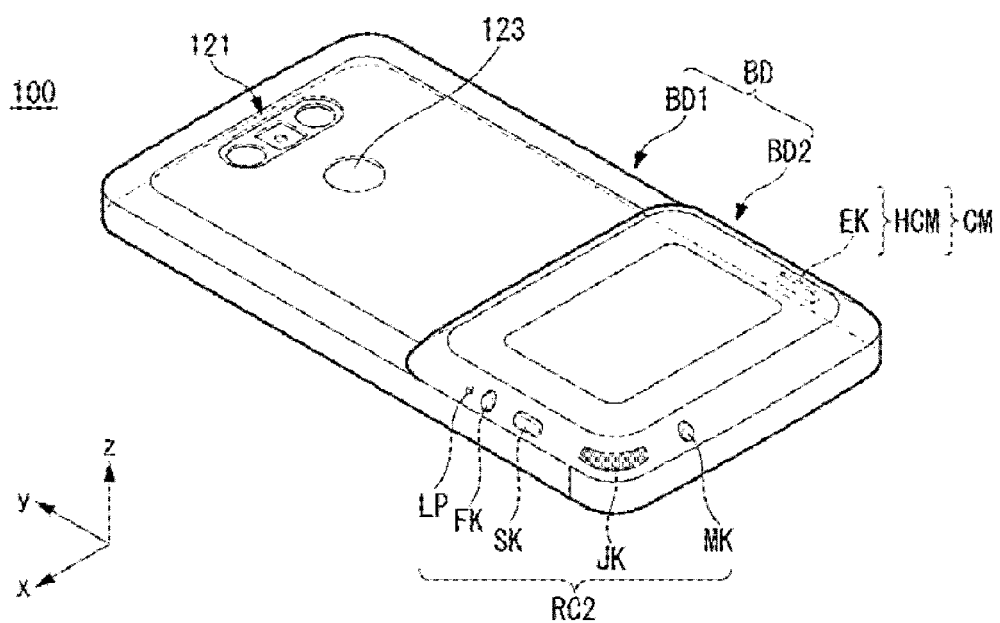
FIG. 1 illustrates a mobile terminal according to an embodiment of the invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as, it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Mobile terminals disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, and the like.

FIG. 1 illustrates a mobile terminal according to an embodiment of the invention. More specifically, FIG. 1 is a back perspective view of a back surface of a mobile terminal 100.

In the embodiment disclosed herein, a coordinate system is a rectangular coordinate system and is a Cartesian coordinate system, i.e., a XYZ coordinate system. In the embodiment disclosed herein, the XYZ coordinate system is a left-handed coordinate system. Namely, when fingers of a left hand are curled from the X-axis to the Y-axis, a direction in which a thumb of the left hand points is the Z-axis.

The mobile terminal 100 may include a body BD. The body BD may include a first body BD1 and a second body BD2. The first body BD1 and the second body BD2 may be coupled with each other or separated from each other. The first body BD1 may be positioned farther than the second body BD2 on the Y-axis. In the embodiment disclosed herein, the fact that something is far positioned on the Y-axis may indicate that something is positioned on an upper part (or an upper side). Further, the fact that something is close positioned on the Y-axis may indicate that the something is positioned on a lower part (or a lower side).

Thus, the first body BD1 may be positioned on the upper part, and the second body BD2 may be positioned on the lower part. The coupling and the separation between the first body BD1 and the second body BD2 may be related to change of a battery of the mobile terminal 100.

The mobile terminal 100 may include a coupler CM. The coupler CM may couple or separate the first body BD1 and the second body BD2. The coupler CM may include a hook coupler HCM. The hook coupler HCM may be formed corresponding to the first body BD1 and the second body BD2. The hook coupler HCM may include an eject key EK. The eject key EK may be positioned on one side of the first body BD1.

A user input unit 123 may be formed on a back surface of the mobile terminal 100. For example, the user input unit 123 may receive a user's touch input. Further, the user input unit 123 may receive a user's fingerprint information.

The mobile terminal 100 may include a camera 121. The camera 121 may be positioned on a back surface of the first body BD1. The camera 121 may be understood to include a camera lens and a camera bracket CB (refer to FIG. 9).

When a user takes a photo or recodes a video using the mobile terminal 100, it may be preferable, but not required, that the mobile terminal 100 is stably positioned in his or her hand. In the following description, the embodiment of the invention is described based on an example where the user holds the mobile terminal 100 with his/her right hand. Other hand, for example, the left hand may be used to hold the mobile terminal 100.

The second body BD2 may provide an area, in which the user's hand is placed. Namely, the user may place his/her hand on the second body BD2 and stably hold the mobile terminal 100. As shown in FIG. 1, the second body BD2 may be thicker than the first body BD1 based on the Z-axis.

The second body BD2 may include a second back cover RC2. As shown in FIG. 1, the second back cover RC2 may form a back appearance of the second body BD2. The second back cover RC2 may be convexly formed toward the back surface of the mobile terminal 100. The second back cover RC2 may include components related to a function and an operation of the camera 121, for example, a lamp LP, a function key FK, a shutter key SK, a jog key JK, and a mode conversion key MK.

The lamp LP may be related to the operation of the camera 121. For example, the lamp LP may be turned on when the camera 121 is operating. The function key FK may perform a flash setting of the camera 121 and a timer setting of the camera 121 and determine whether or not a series of photos are taken. The shutter key SK of the camera 121 may adjust a focus of the camera 121. The jog key JK may be driven in a jog shuttle manner and may perform zoom-in and zoom-out operations. The mode conversion key MK may select a photo mode and a video mode.

Figure 2:
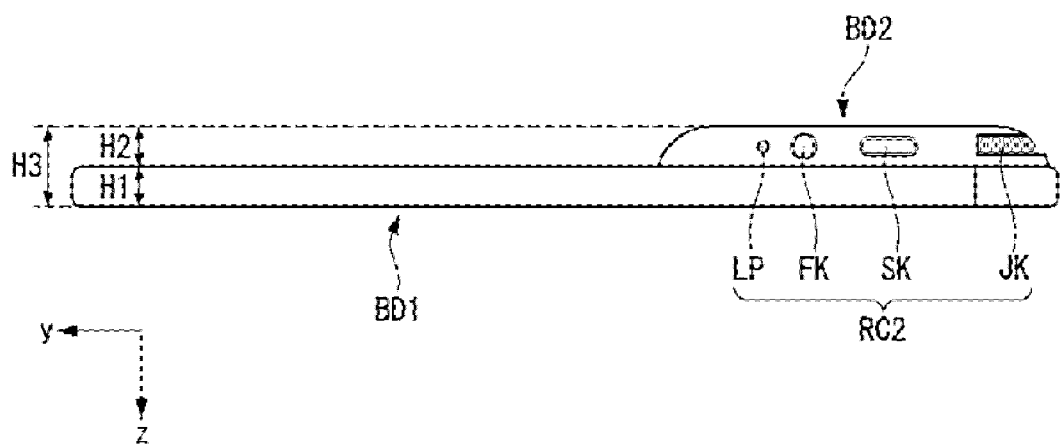
FIG. 2 is a side view of a mobile terminal shown in FIG. 1.

FIG. 2 is a side view of the mobile terminal shown in FIG. 1. The mobile terminal 100 may have different thicknesses along the Y-axis. For example, a thickness of the mobile terminal 100 in an area, in which the camera 121 is positioned, may be less than a thickness of the mobile terminal 100 in an area, in which the camera 121 is not positioned.

A thickness H1 may indicate a thickness of the mobile terminal 100 in an area, in which the camera 121 is positioned. In the embodiment disclosed herein, a thickness of the mobile terminal 100 may mean a thickness of the mobile terminal 100 in a direction from a front surface to the back surface of the mobile terminal 100. Namely, the thickness of the mobile terminal 100 may mean a thickness of the mobile terminal 100 in a direction of the z-axis. The thickness H1 may indicate a thickness of the first body BD1.

A thickness H2 may indicate an increased thickness of the first body BD1 in the direction of the z-axis by connecting the second body BD2 to the first body BD1. The thickness H2 may be related to a grip feeling of the user with respect to the mobile terminal 100.

A thickness H3 may indicate a thickness in a thickest area of the mobile terminal 100. The thickness H3 may be a sum of the thicknesses H1 and H2. The thickness H3 may be related to a grip feeling of the user with respect to the mobile terminal 100.

When the user holds the second body BD2 with his/her right hand, the thicknesses H2 and H3 may be important. When the user holds the second body BD2 with his/her right hand, last knuckles of his/her right fingers may be placed on a portion having the thickness H2. Further, when the user holds the second body BD2 with his/her right hand, his/her right palm may be placed on a portion having the thickness H3. When there is no second body BD2, an area, in which the user's right fingers can be placed, may not be provided. Further, the thickness of a portion, on which the user's right palm is placed, may be 'H1' and may be less than 'H3'. Namely, the mobile terminal 100 according to the embodiment of the invention can provide the improved grip feeling for the user.

Figure 3:
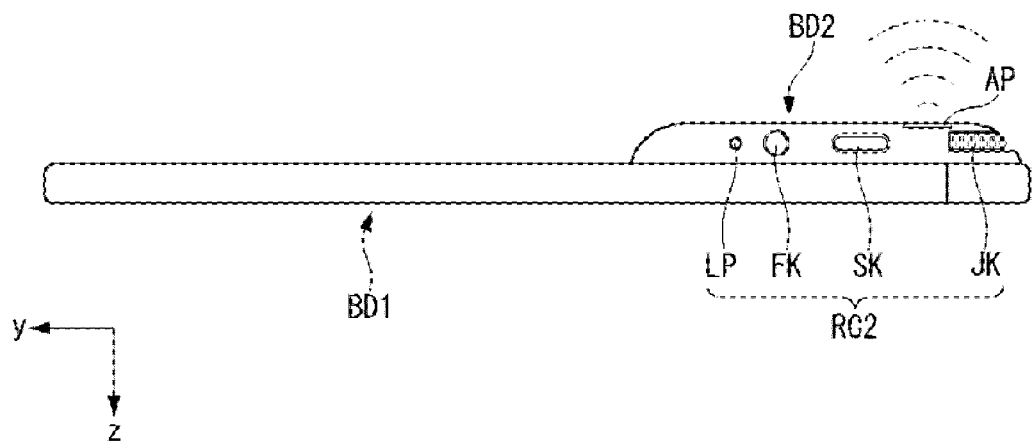
FIG. 3 illustrates transmission and reception of radio waves of a mobile terminal shown in FIG. 2.

FIG. 3 illustrates an antenna operation of the mobile terminal 100 shown in FIG. 1. As shown in FIG. 3, the mobile terminal 100 according to the embodiment of the invention may include an antenna pattern AP.

The antenna pattern AP may be positioned inside the second body BD2. The antenna pattern AP may be positioned adjacent to the second back cover RC2. The second back cover RC2 may have a shape protruding to the outside. Namely, the second back cover RC2 may have a shape protruding toward a negative direction of the z-axis. Thus, when the antenna pattern AP is positioned adjacent to the second back cover RC2, radio waves can be easily transmitted and received.

As shown in FIG. 3, the antenna pattern AP may be formed inside the second back cover RC2. FIG. 3 illustrates that the antenna pattern AP transmits and receives radio waves. When the user holds the second body BD2 with his/her hand, radio waves may be transmitted and received between his/her fingers.

The antenna pattern AP may be formed adjacent to the second back cover RC2. The second back cover RC2 may be formed of a material capable of transmitting and receiving the radio waves. For example, the second back cover RC2 may be formed of a plastic material. Further, the second back cover RC2 may be formed by injection-molding a polymer material. A portion of the second back cover RC2, in which the antenna pattern AP is positioned, may include the plastic material or the polymer material.

Figure 4:
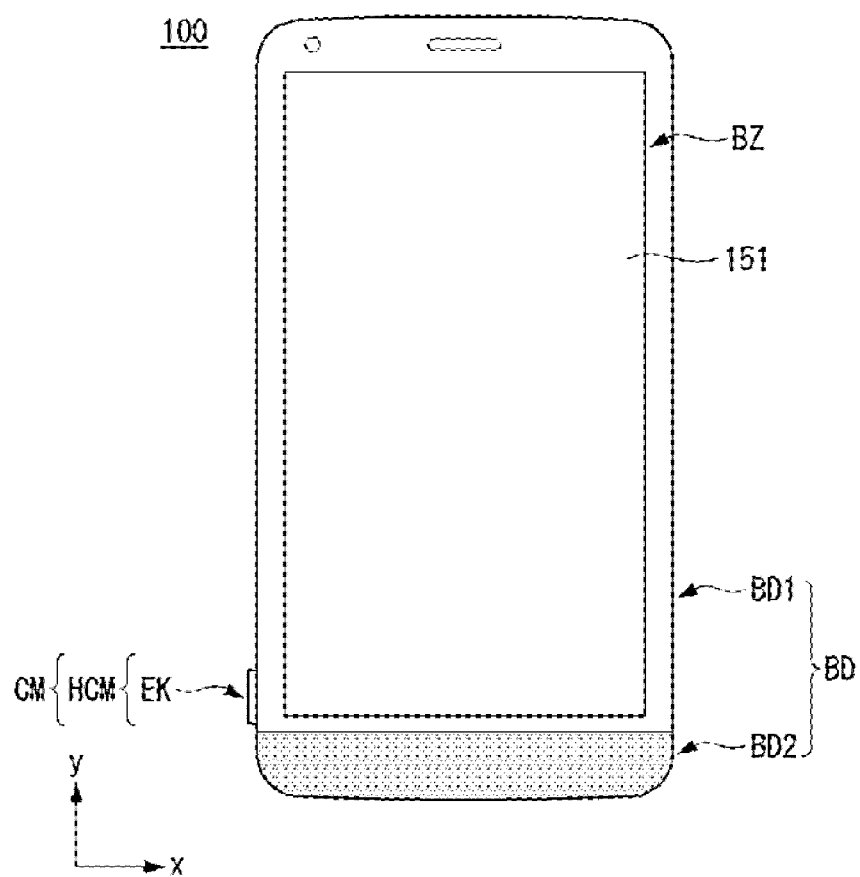
FIG. 4 is a front view of a mobile terminal shown in FIG. 1.

FIG. 4 is a front view of the mobile terminal shown in FIG. 1. The mobile terminal 100 may include a body BD. The body BD may include a first body BD1 and a second body BD2. A display 151 may be positioned on a front surface of the first body BD1. The display 151 may be a component displaying visual information. In the embodiment disclosed herein, "a display unit' is interpreted as the same sense as the display 151. A bezel BZ may be formed to surround the display 151.

The first body BD1 and the second body BD2 may be coupled with each other or separated from each other. FIG. 4 illustrates that the first body BD1 and the second body BD2 are coupled or connected with each other. The coupling and the separation between the first body BD1 and the second body BD2 may be related to change of the battery of the mobile terminal 100.

A cover of the mobile terminal 100 may be formed as one body along with the body BD. In particular, when a back cover is formed of metal, the cover of the mobile terminal 100 may not be separated from the body BD. In this instance, in a related art, it was difficult to change the battery of the mobile terminal 100. However, in the mobile terminal 100 according to the embodiment of the invention, the battery may be connected to the second body BD2. Therefore, in the mobile terminal 100 according to the embodiment of the invention, the battery can be changed.

An eject key EK may be positioned on the side of the first body BD1. The eject key EK may be concerned in the coupling and the separation between the first body BD1 and the second body BD2. In other words, the user may separate the first body BD1 from the second body BD2 by operating the eject key EK.

Figure 5:
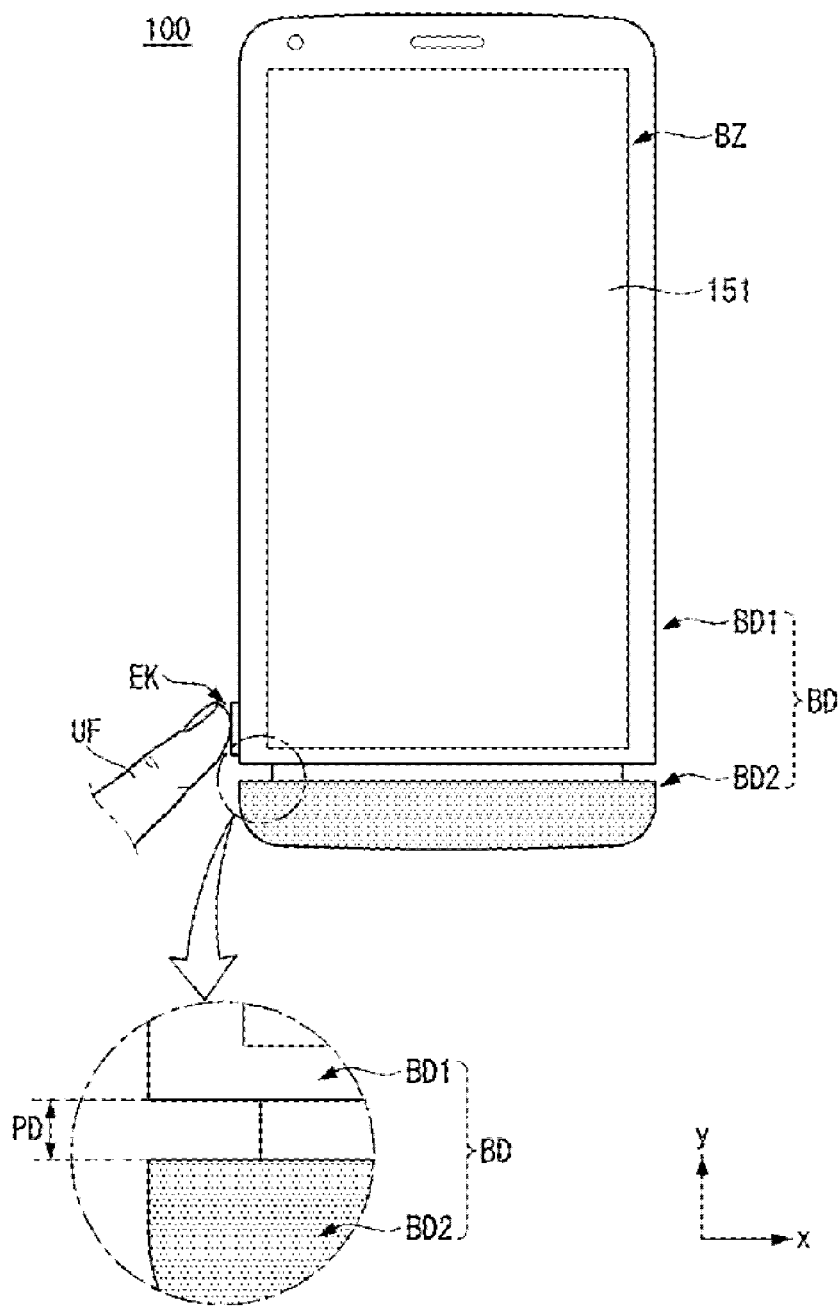
Figure 6:
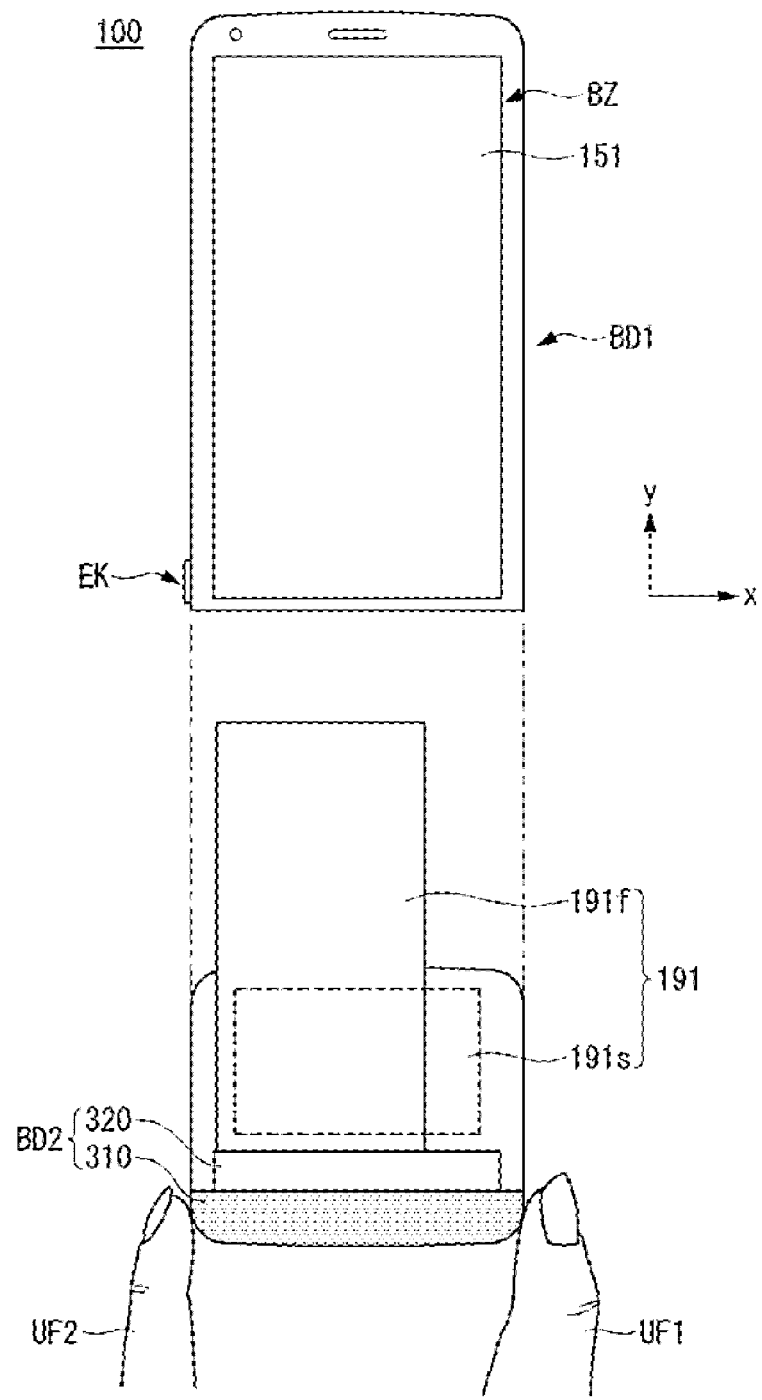

FIGS. 5 to 7 illustrate an operation of a mobile terminal shown in FIG. 4.

FIG. 5 illustrates the mobile terminal according to the embodiment of the invention when the user presses the eject key EK using his/her finger UF, etc.

When the eject key EK is pressed, the second body BD2 may be separated from the first body BD1 by a distance PD. A direction, in which the second body BD2 moves from the first body BD1, may be the negative direction of the y-axis. In other words, as the eject key EK is pressed, the second body BD2 may be separated from the first body BD1 and may move toward the lower part. In other words, the mobile terminal 100 may be in one of a plurality of statuses. For example, the plurality of statuses may include a first status in which the first and second bodies BD1 and BD2 are coupled, a second status in which the first and second bodies BD1 and BD2 are separated from each other by the distance PD while overlapping each other, and a third status in which the first and second bodies BD1 and BD2 are fully separated from each other.

A direction, in which the eject key EK is pressed, may be a direction of the x-axis. The direction, in which the eject key EK is pressed, may be substantially vertical to a moving direction of the second body BD2. One eject key EK or a plurality of eject keys EK may be provided in the embodiment of the invention.

FIG. 6 illustrates that the second body BD2 is separated from the first body BD1 in accordance with the embodiment of the invention. For example, the mobile terminal 100 may be in the third status in which the second body BD2 is fully separated from the first body BD1. The user may hold the second body BD2 with his/her first and second fingers UF1 and UF2. The user may move the second body BD2 with the first and second fingers UF1 and UF2 in a direction far from the first body BD1.

The mobile terminal 100 according to the embodiment of the invention may include a first battery 191$f$. The first battery 191$f$ may supply electric power to the mobile terminal 100. The first battery 191$f$ may be physically connected to the second body BD2. When the second body BD2 is separated from the first body BD1, the first battery 191$f$ may be separated from the first body BD1 while being connected to the second body BD2. In other words, the second body BD2 may be coupled with a member. The member capable of being coupled with the second body BD2 may be the first battery 191$f$.

The second body BD2 may include a second body outer part 310 and a second body inner part 320. The second body outer part 310 may form an external appearance of the second body BD2. The second body outer part 310 may be positioned in the negative direction of the y-axis compared to the second body inner part 320. Namely, the second body outer part 310 may be positioned further, from the first body BD1 than the second body inner part 320.

The second body inner part 320 may be positioned relatively closer to the first body BD1 than the second body outer part 310. The second body inner part 320 may be connected to the first battery 191$f$. The second body inner part 320 may be attached to the first battery 191$f$ and separated to the first battery 191$f$.

The user may move the second body BD2 toward the first body BD1 with the first and second fingers UF1 and UF2. One end of the first body BD1 may be opened. Namely, an end of the first body BD1 toward the second body BD2 may be opened. The second body BD2 may be inserted into the opened end of the first body BD1 and coupled with the first body BD1. The second body inner part 320 may be inserted into the opened end of the first body BD1. The second body outer part 310 may not be inserted into the opened end of the first body BD1.

The second body inner part 320 may be inserted into the first body BD1, and the second body outer part 310 may not be inserted into the first body BD1. Therefore, the second body outer part 310 and the second body inner part 320 may be connected to each other but have a portion apart from each other Thus, the second body BD2 may have a ⊏-shape.

The mobile terminal 100 according to the embodiment of the invention may include a second battery 191$s$. The second battery 191$s$ may be connected to the second body BD2. The second battery 191$s$ may supply electric power to the second body BD2 and the first body BD1.

FIG. 7 illustrates that the first battery 191$f$ is changed in accordance with the embodiment of the invention. The mobile terminal 100 according to the embodiment of the invention is possible to change the battery. In a related art mobile terminal, the battery was changed by opening a rear cover.

A rear cover may be formed as one body along with a main body. In other words, the rear cover may be formed as one body along with the first body BD1 and thus cannot be separated from the first body BD1. In this instance, in the mobile terminal 100 according to the embodiment of the invention, because the second body BD2 may be separated from the first body BD1, the first battery 191$f$ may be changed. Thus, the embodiment of the invention can provide both a design advantage obtained from the integrated rear cover and the use convenience obtained from the battery change.

A first battery 191$a$, that has been connected to the second body BD2, may be separated from the second body BD2. The first battery 191$a$, that has been connected to the second body BD2, may be the first battery 191$f$ that needs to be charged.

The second body BD2 may be connected to a new first battery 191$b$. The new first battery 191$b$ connected to the second body BD2 may be a fully charged battery. The user may change the first battery 191$f$ for the first battery 191$b$ and thus may rapidly supply electric power to the mobile terminal 100.

Figure 8:
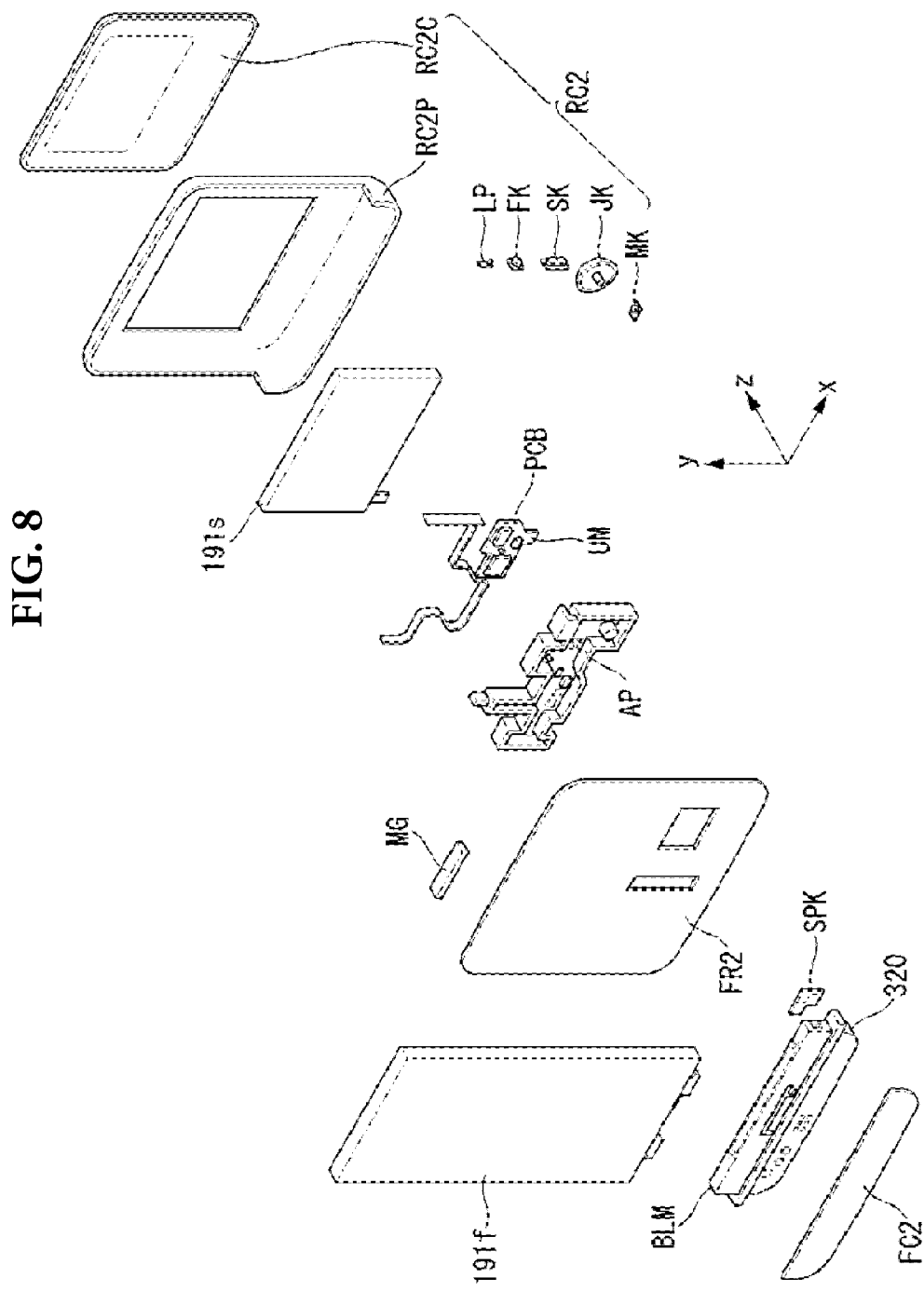
FIG. 8 is an exploded perspective view of a second body shown in FIG. 1.

FIG. 8 is an exploded perspective view of the second body BD2. In FIG. 8, the first battery 191$f$ is shown because the first battery 191$f$ electrically connected to the first body BD1 may be physically connected to the second body BD2. The second body BD2 according to the embodiment of the invention may include a second body outer part 310 and a second body inner part 320.

The second body outer part 310 may form an external appearance of the second body BD2. The second body outer part 310 may provide an improved grip feeling for the user when the user holds the mobile terminal 100. The second body outer part 310 may include a second frame FR2, a second front cover FC2, and a second back cover RC2.

The second frame FR2 may face toward the back surface of the first body BD1. The second frame FR2 may contact the back surface of the first body BD1. A contact portion of the second frame FR2 and the first body BD1 may not be seen to the outside.

The second front cover FC2 may form a front appearance of the second body BD2. The second front cover FC2 may form a portion of the front surface of the mobile terminal 100 when the second body BD2 is connected to the first body BD1. The second front cover FC2 may be positioned opposite the second back cover RC2.

The second back cover RC2 may form a back appearance of the second body BD2. The second back cover RC2 may form a portion of the back surface of the mobile terminal 100 when the second body BD2 is connected to the first body BD1. The second back cover RC2 may be positioned opposite the second front cover FC2. The second back cover RC2 may include a second back cover outer portion RC2P and a second back cover lid RC2C. The second back cover RC2 may be coupled with a member. The member capable of being coupled with the second back cover RC2 may be a second battery 191s.

The second back cover outer portion RC2P may form a thickness of the second back cover RC2 in the z-axis. Alternatively, the second back cover outer portion RC2P may form an entire external appearance of the second back cover RC2. The second back cover outer portion RC2P may provide a space, in which the second battery 191s is placed. Namely, the second battery 191s may be positioned in the space provided by the second back cover outer portion RC2P. The second back cover outer portion RC2P may have a structure which is open to an outside, so that the second battery 191s can be changed. Namely, the second back cover outer portion RC2P may be configured such that its middle is empty.

The second back cover lid RC2C may be connected to or separated from the second back cover outer portion RC2P. The second back cover lid RC2C may form a portion of the external appearance of the second back cover RC2. The second back cover lid RC2C may be positioned opposite the second front cover FC2.

The second body inner part 320 may include a battery locking module BLM. The battery locking module BLM may be physically connected to the first battery 191f. The battery locking module BLM may be physically connected to or separated from the first battery 191f. In other words, the second body inner part 320 may be coupled with a member. The member capable of being coupled with the second body inner part 320 may be the first battery 191f.

The second body BD2 may include a speaker SPK, a USB module UM, and a third board PCB. The speaker SPK may be positioned between the second front cover FC2 and the second back cover RC2. The speaker SPK may provide a sound or voice information for the user.

The third board PCB may be positioned between the second front cover FC2 and the second back cover RC2. The third board PCB may be connected to the speaker SPK, the USB module UM, the antenna pattern AP, etc. The third board PCB may transmit and receive electrical signals to and from the speaker SPK, the USB module UM, the antenna pattern AP, etc.

The USB module UM may be positioned between the second front cover FC2 and the second back cover RC2. The USB module UM may be connected to an external USB. Namely, the USB module UM may be configured such that the mobile terminal 100 according to the embodiment of the invention USB-communicates with an external device.

The second body BD2 may include a lamp LP, a function key FK, a shutter key SK, a jog key JK, and a mode conversion key MK. The lamp LP, the function key FK, the shutter key SK, the jog key JK, and the mode conversion key MK may be components related to a function and an operation of the camera 121 and may be positioned on the second back cover RC2. The function key FK, the shutter key SK, and the mode conversion key MK may be a button type component and may receive a push input of the user.

The second body BD2 may include a magnet coupler MG. The magnet coupler MG may be magnetic. The magnet coupler MG may be positioned adjacent to the second body outer part 310. The magnet coupler MG may be connected to the second frame FR2 or the second back cover RC2. The magnet coupler MG may be a component for coupling the second body BD2 and the first body BD1.

Figure 9:
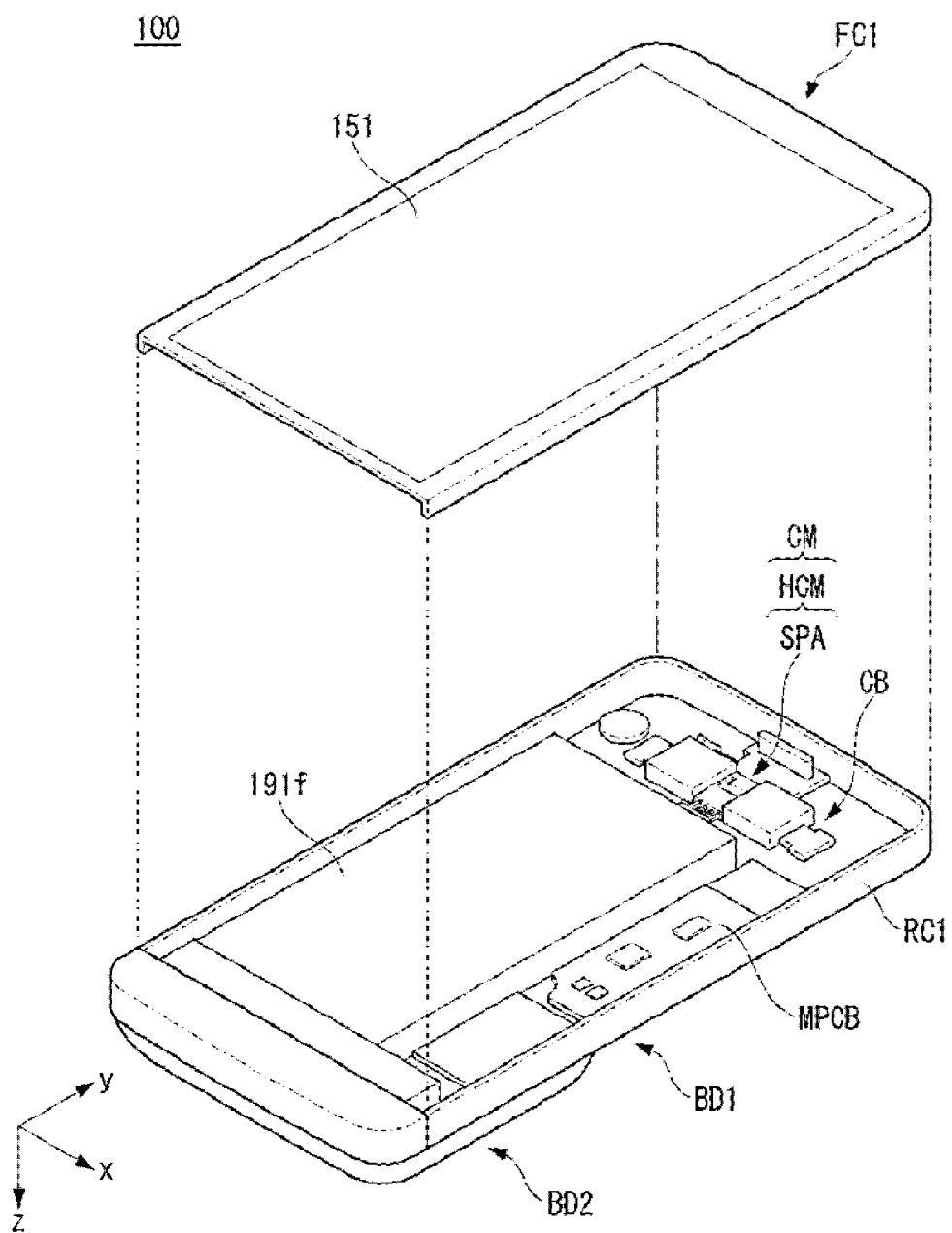
FIG. 9 is an exploded perspective view of a mobile terminal shown in FIG. 1.

FIG. 9 is an exploded perspective view of the mobile terminal shown in FIG. 1.

The first body BD1 may include a first front cover FC1, a first back cover RC1, a main board MPCB, a spring assembly SPA, and a camera bracket CB.

The main board MPCB, the spring assembly SPA, and the camera bracket CB may be positioned between the first front cover FC1 and the first back cover RC1. The first front cover FC1 may face toward the front surface of the mobile terminal 100. Namely, the first front cover FC1 may face toward the negative direction of the z-axis. The display 151 may be formed on the first front cover FC1. The first back cover RC1 may face toward the back surface of the mobile terminal 100. Namely, the first back cover RC1 may face toward a positive direction of the z-axis.

The first front cover FC1 and the first back cover RC1 may be formed as one body. Namely, the first front cover FC1 and the first back cover RC1 may not be separated from each other. In FIG. 9, the first front cover FC1 and the first back cover RC1 are exploded and shown for the sake of brevity and ease of reading.

The main board MPCB may be positioned next to the first battery 191f. The main board MPCB may be concerned in an entire operation of the mobile terminal 100. The main board MPCB may be connected to the first battery 191f, the display 151, and the camera 121, and the like.

The camera bracket CB may be positioned on the upper side of the mobile terminal 100. Namely, the camera bracket CB may be positioned closer to an upper end of the first body BD1 than the first battery 191f. The camera bracket CB may provide a space, in which a camera is mounted. The camera bracket CB according to the embodiment of the invention may provide a space, in which two cameras are mounted.

The spring assembly SPA may be connected to the camera bracket CB. The spring assembly SPA may provide a force between the camera bracket CB and the first battery 191f. The force provided by the spring assembly SPA may be a restoring force or an elastic force. The spring assembly SPA may provide a force, that causes the second body BD2 to be separated from the first body BD1. A direction of the force, that the spring assembly SPA provides for the second body BD2, may be a downward direction (i.e., the negative direction of the y-axis) based on the first body BD1. The spring assembly SPA may include a hook coupler HCM. Namely, the spring assembly SPA may function to couple and separate the first body BD1 and the second body BD2.

FIGS. 10 to 14 illustrate an eject key of the mobile terminal shown in FIG. 1 and a configuration related to the eject key.

Figure 10:
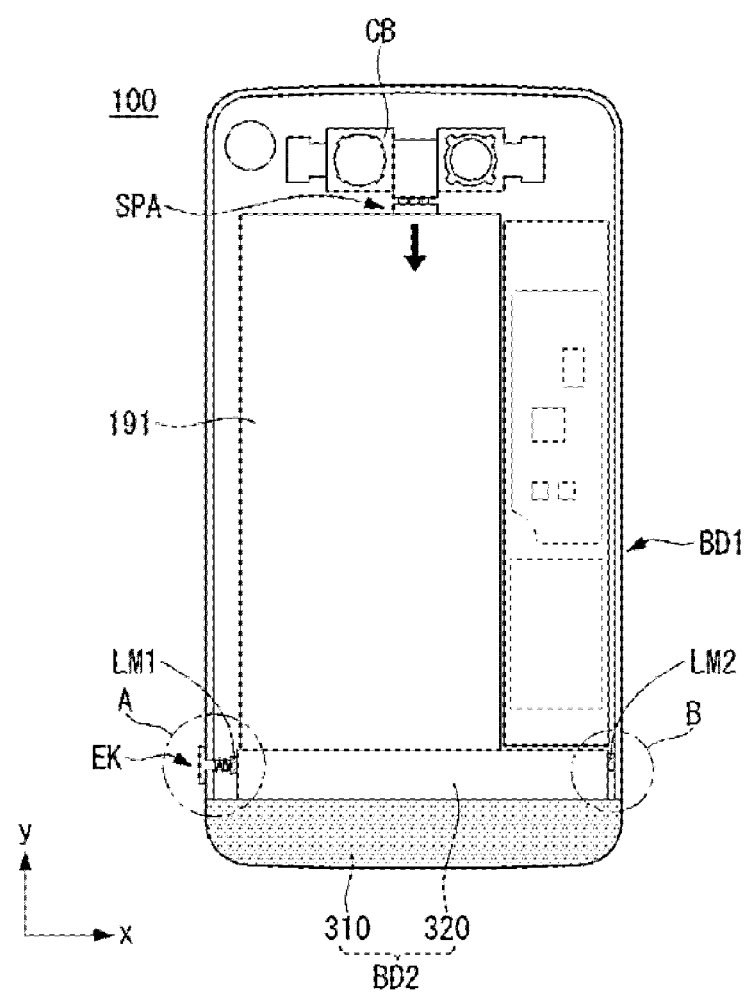
FIGS. 10 to 14 illustrate an eject key of a mobile terminal shown in FIG. 1 and a configuration related to the eject key.

As shown in FIG. 10, the second body BD2 may include a first locking module LM1 and a second locking module LM2. The first body BD1 according to the embodiment of the invention may include an eject key EK and a second locking module housing LM2H (refer to FIG. 14). FIG. 10 shows the mobile terminal 100, in which the first front cover FC1 is removed, for the sake of brevity and ease of reading. The first locking module LM1 and the second locking module LM2 may function to couple and separate the first body BD1 and the second body BD2 and may be included in the hook coupler HCM.

The first locking module LM1 may be positioned on the side of the second body BD2 adjacent to the eject key EK. The first locking module LM1 may contact the eject key EK. The first locking module LM1 may be connected to the eject key EK. Namely, the first locking module LM1 may be positioned on one side of the second body BD2.

The first locking module LM1 may move by a predetermined distance on one side of the second body BD2. A connection relationship between the first body BD1 and the second body BD2 may vary depending on a position of the first locking module LM1 on one side of the second body BD2. In other words, the movement of the second body BD2 resulted from the elastic force provided by the spring assembly SPA may be determined depending on a position of the first locking module LM1 on one side of the second body BD2. In FIG. 10, an arrow indicates a direction of the elastic force provided by the spring assembly SPA, and "A" indicates an area, in which the eject key EK and the first locking module LM1 are positioned.

The second locking module LM2 may be positioned on the other side of the second body BD2. For example, the second locking module LM2 may be positioned opposite the first locking module LM1. Namely, the second locking module LM2 may face the first locking module LM1 on the line substantially parallel to the x-axis. The second locking module LM2 may be connected to the second locking module housing LM2H. The second locking module LM2 may be inserted into the second locking module housing LM2H. The fact that the second locking module LM2 is inserted into the second locking module housing LM2H may indicate that the second body BD2 is not separated from the first body BD1. In FIG. 10, "B" indicates an area, in which the second locking module LM2 and the second locking module housing LM2H are positioned.

The spring assembly SPA may provide an elastic force, that causes the second body BD2 to be separated from the first body BD1. Namely, the second body BD2 may move through the elastic force provided by the spring assembly SPA, so that the second body BD2 is separated from the first body BD1.

The first locking module LM1 and the second locking module LM2 may put a limit on a movement of the second body BD2. The movement of the second body BD2 may be obstructed through an operation of the first locking module LM1 and the eject key EK. The movement of the second body BD2 may be obstructed through an operation of the second locking module LM2 and the second locking module housing LM2H.

Figure 11:
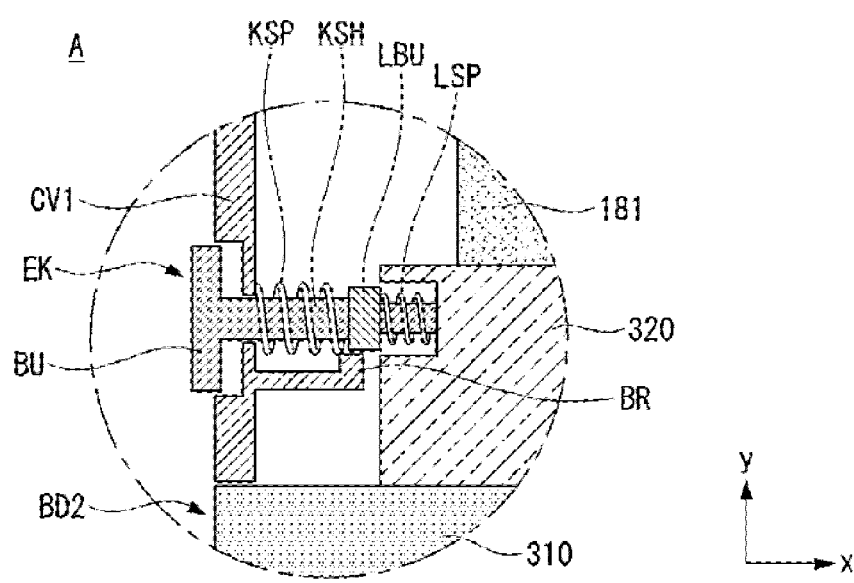
Figure 12:
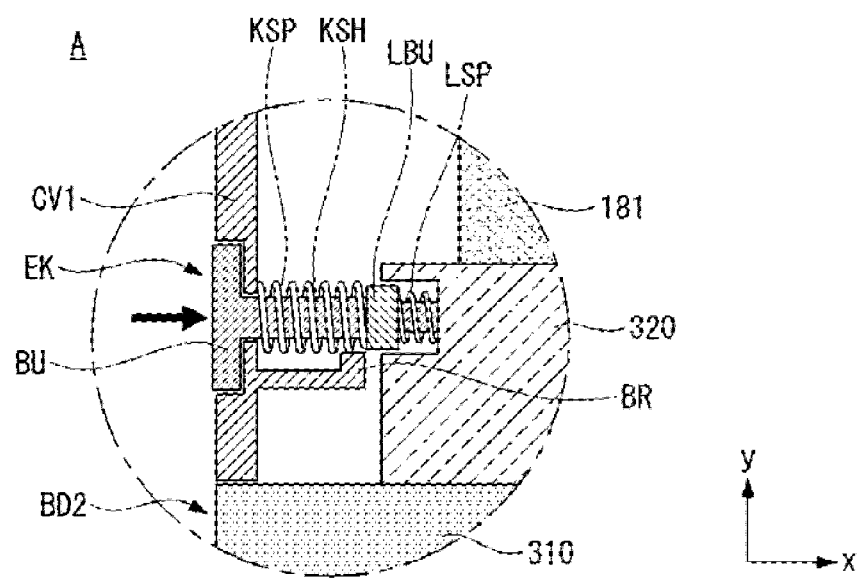
Figure 13:
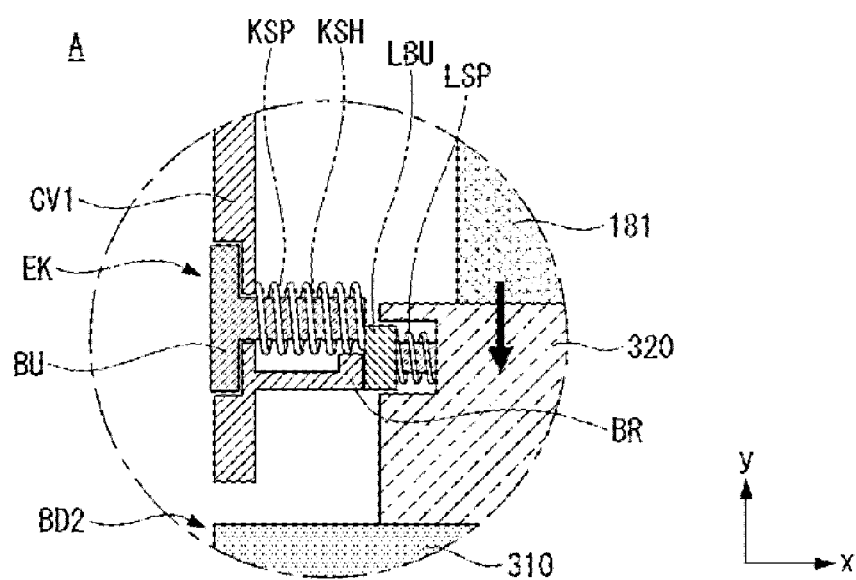

FIGS. 11 to 13 are cross-sectional views illustrating the area "A" of FIG. 10. However, a key spring KSP and a locking spring LSP are shown as a perspective view in FIGS. 11 to 13. FIGS. 11 to 13 sequentially illustrate a movement of the first locking module LM1 and a movement of the second body BD2 as the eject key. EK is pressed by an external force. The first front cover FC1 (refer to FIG. 9) and the first back cover RC1 (refer to FIG. 9) may form a first cover CV1.

The eject key EK may include a button BU, a key shaft KSH, a key spring KSP, and a finger stop BR. The button BU may form a portion exposed to the outside from the eject key EK and may be connected to the key shaft KSH. The button BU may receive a force from the outside and may transfer the force to the key shaft KSH.

At least a portion of the key shaft KSH may pass through a portion of the first cover CV1. The key shaft KSH may contact a locking button LBU. The key shaft KSH may transfer the force to the locking button LBU.

One end of the key spring KSP may be connected to the first cover CV1, and the other end of the key spring KSP may be connected to the key shaft KSH. The key spring KSP may provide an elastic force for the key shaft KSH.

The finger stop BR may be connected to the first cover CV1. The finger stop BR may be positioned inside the first cover CV1 and may be extended toward the inside of the first cover CV1. The finger stop BR may contact the locking button LBU.

The first locking module LM1 may include a locking button LBU, a locking shaft LSH, and a locking spring LSP. The locking button LBU may adjoin the key shaft KSH. The locking button LBU may be connected to the locking shaft LSH.

The locking shaft LSH may be connected to the locking button LBU. The locking shaft LSH may receive a force from the locking button LBU or may transfer the force to the locking button LBU. Namely, the locking button LBU may transfer the force received from the key shaft KSH to the locking shaft LSH, and the locking shaft LSH may transfer the force received from the locking spring LSP to the locking button LBU.

One end of the locking spring LSP may be connected to the locking shaft LSH, and the other end of the locking spring LSP may be connected to one side of the second body inner part 320. The locking spring LSP may provide an elastic force for the locking shaft LSH.

Figure 14:
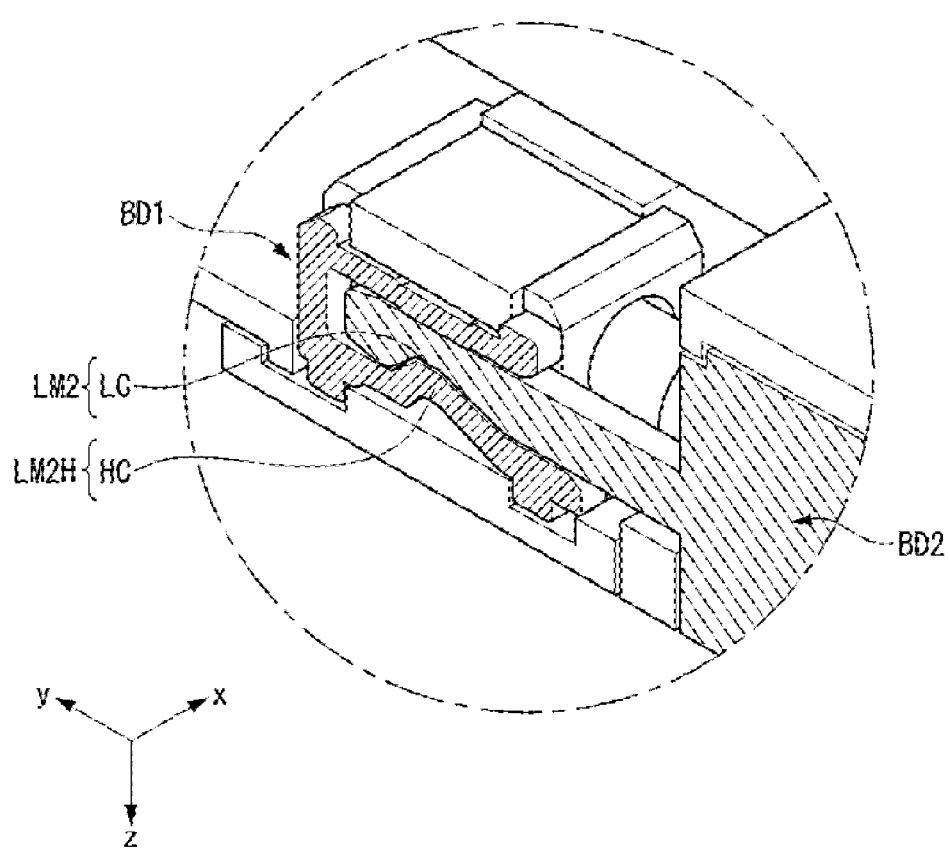

When the finger stop BR contacts the locking button LBU, the finger stop BR may be positioned on a path of the locking button LBU moving through an elastic force provided by the spring assembly SPA. Thus, as shown in FIG. 14, when the finger stop BR contacts the locking button LBU, it may be difficult to downwardly (or in the negative direction of the y-axis) move the second body BD2.

FIG. 12 illustrates a status when a force is applied to the button BU through a user's finger UF. In FIG. 12, an arrow indicates a direction of a force of a spring. Namely, the key spring KSP may provide the elastic force for the key shaft KSH in a direction pushing the button BU to the outside. Further, the locking spring LSP may provide the elastic force for the locking shaft LSH in a direction hooking the locking button LBU to the finger stop BR.

The locking button LBU may be substantially separated from the finger stop BR through an operation of the user's finger UF. Namely, the finger stop BR may not be positioned on a moving path of the locking button LBU.

FIG. 13 illustrates that the second body BD2 moves as the first locking module LM1 is released. In FIG. 13, an arrow indicates a direction of the elastic force applied by the spring assembly SPA.

FIG. 14 is a perspective view illustrating an area "B" shown in FIG. 10. The second locking module LM2 may have a locking curved portion LC. The second locking module housing LM2H may have a housing curved portion HC.

The locking curved portion LC may be positioned opposite the housing curved portion HC. A shape of the locking curved portion LC may correspond to a shape of the housing curved portion HC. For example, if the locking curved portion LC may have a convex shape protruding toward the housing curved portion HC, the housing curved portion HC may have a concave shape depressed toward the locking curved portion LC.

The locking curved portion LC may have a convex shape protruding toward the housing curved portion HC. The locking curved portion LC may have a concave shape depressed toward the housing curved portion HC. When the locking curved portion LC has the concave shape depressed toward the housing curved portion HC, a space may be saved.

The locking curved portion LC may be inserted into the housing curved portion HC. Namely, the second locking module LM2 may be inserted into the second locking module housing LM2H. As the locking curved portion LC is inserted into the housing curved portion HC, the second body BD2 may not be separated from the first body BD1.

FIG. 15 illustrates a status of the mobile terminal according to the embodiment of the invention.

As shown in FIG. 15, the mobile terminal 100 may be in one of a first status, a second status, and a third status.

The first status is a status in which the first and second bodies BD1 and BD2 are fully coupled. In the first status, the battery 191 is electrically connected to the first body BD1. Further, in the first status, the first locking module LM1 is fastened to the eject key EK, and the second locking module LM2 is fastened to the second locking module housing LM2H.

The second status is a status in which the first and second bodies BD1 and BD2 are semi-coupled. In the second status, the battery 191 is electrically connected to the first body BD1. Further, in the second status, the first locking module LM1 is released from the eject key EK, and the second locking module LM2 is fastened to the second locking module housing LM2H.

The third status is a status in which the first and second bodies BD1 and BD2 are separated. In the third status, the battery 191 is disconnected from the first body BD1. Further, in the third status, the first locking module LM1 is released from the eject key EK, and the second locking module LM2 is separated from the second locking module housing LM2H.

Figure 16:
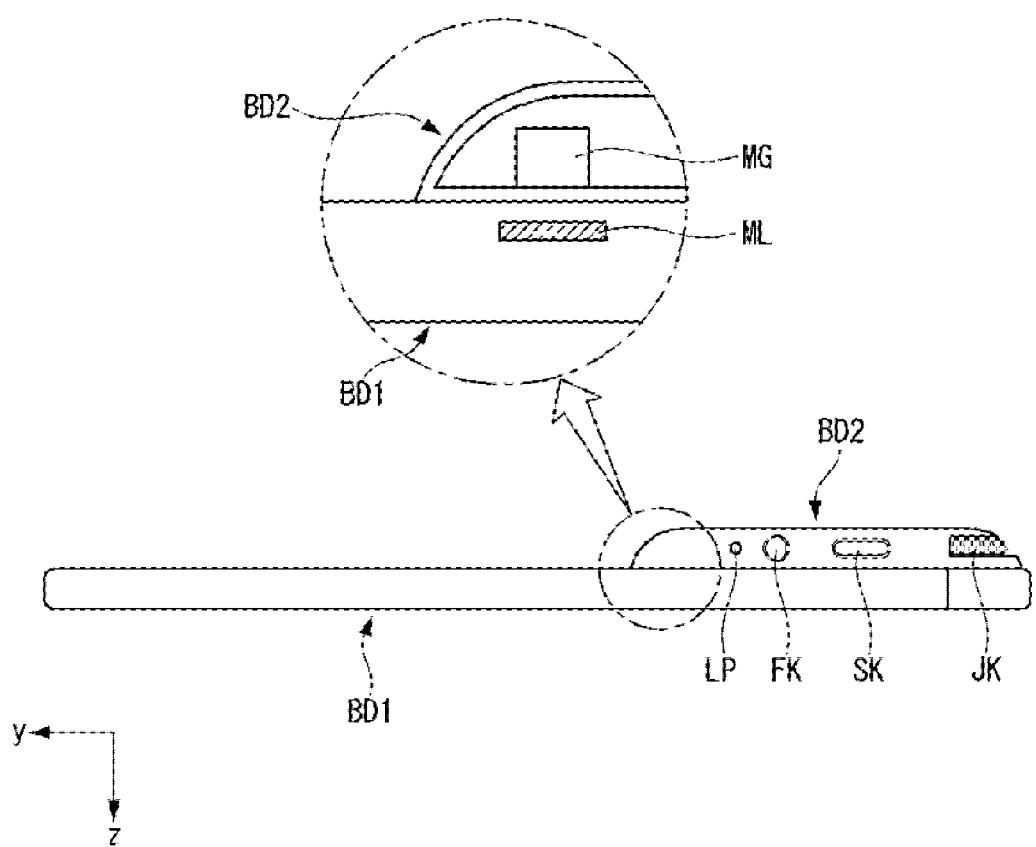
FIGS. 16 and 17 illustrate configuration of a magnet coupler and a magnetic connector according to an embodiment of the invention.

FIG. 16 illustrates configuration of a magnet coupler and a magnetic connector according to the embodiment of the invention.

A magnet coupler MG may be included in the second body BD2. Alternatively, the magnet coupler MG may be positioned on one side of the second body BD2. The magnet coupler MG may be magnetic. Namely, the magnet coupler MG may maintain magnetic properties. In other words, the magnet coupler MG may form a magnetic flux.

A magnetic connector ML may be included in the first body BD1. Alternatively, the magnetic connector ML may be positioned on one side of the first body BD1. The magnetic connector ML may be magnetically coupled with the magnet coupler MG. Namely, the magnetic connector ML may form a magnetic flux in response to the magnetic flux formed by the magnet coupler MG. Before the magnet coupler MG approaches the magnetic connector ML, the magnetic connector ML may not form the magnetic flux.

The magnetic connector ML may include a paramagnetic material. The paramagnetic material may form a magnetic flux by itself in response to a magnetic flux. The paramagnetic material may slightly react to a magnetic flux provided from the outside. When the magnetic connector ML is the paramagnetic material, the magnetic connector ML may not form the magnetic flux before the magnet coupler MG approaches the magnetic connector ML.

The magnetic connector ML may include a ferromagnetic material. The ferromagnetic material may form a magnetic flux by itself in response to a magnetic flux. A magnetic flux provided from the outside may more react to the ferromagnetic material than the paramagnetic material. When the magnetic connector ML is the ferromagnetic material, a magnetic flux for coupling the first and second bodies BD1 and BD2 can be sufficiently provided.

Figure 17:
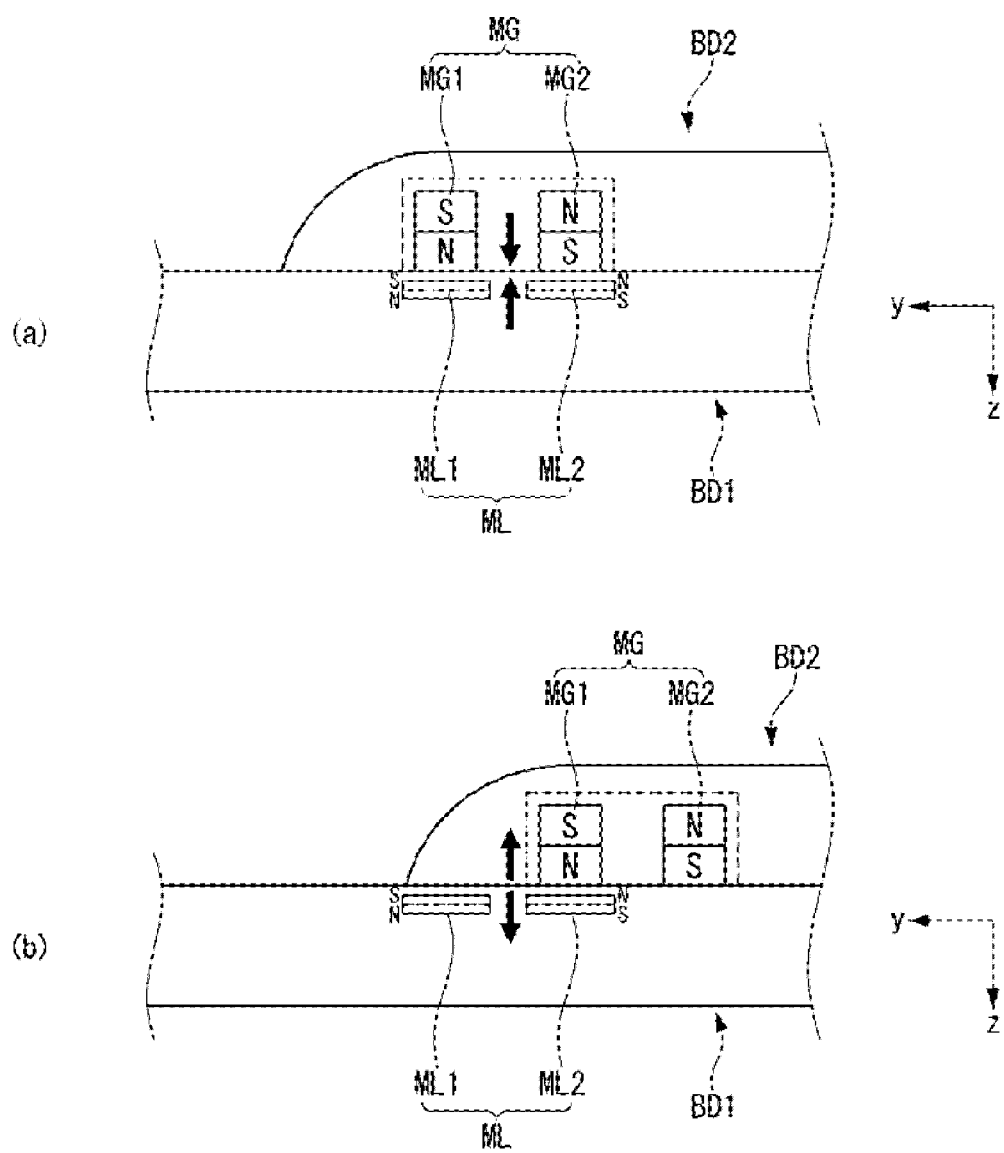

FIG. 17 illustrates an example of configuration of the magnet coupler and the magnetic connector shown in FIG. 16. A plurality of magnet couplers MG according to the embodiment of the invention may be provided. The plurality of magnet couplers MG may include a first magnet MG1 and a second magnet MG2. The first magnet MG1 and the second magnet MG2 may be arranged in substantially parallel with the y-axis. In other words, the first magnet MG1 and the second magnet MG2 may be arranged side by side.

The first magnet MG1 and the second magnet MG2 may be arranged so that their magnetic fluxes face toward a direction substantially parallel to a direction toward the back surface of the first body BD1. In particular, the magnetic fluxes of the first magnet MG1 and the second magnet MG2 may face in opposite directions. Namely, the first magnet MG1 and the second magnet MG2 may have different polarities and face toward the back surface of the first body BD1.

A plurality of magnetic connectors ML according to the embodiment of the invention may be provided. The plurality of magnetic connectors ML may include a first magnetic connector ML1 and a second magnetic connector ML2. The first magnetic connector ML1 and the second magnetic connector ML2 may respectively correspond to the first magnet MG1 and the second magnet MG2. The first magnetic connector ML1 and the second magnetic connector ML2 may be arranged in substantially parallel with the y-axis. The magnetic connector ML may have a plate shape.

When the magnetic connector ML includes a ferromagnetic material, the magnetic connector ML may have remanent magnetization. Namely, when the magnetic connector ML includes the ferromagnetic material, the magnetic connector ML may have the remanent magnetization before the magnet coupler MG approaches the magnetic connector ML. Alternatively, when the magnetic connector ML includes the ferromagnetic material, the magnetic connector ML may have the remanent magnetization when the magnetic connector ML is magnetically coupled with the magnet coupler MG and then is separated from the magnet coupler MG. The remanent magnetization is characteristic of the ferromagnetic material and may be attributable to hysteresis characteristic.

In FIG. 17, (a) illustrates that the first body BD1 and the second body BD2 are coupled due to the magnetic coupling between the magnet coupler MG and the magnetic connector ML. In other words, the first magnet MG1 may be magnetically coupled with the first magnetic connector ML1, and the second magnet MG2 may be magnetically coupled with the second magnetic connector ML2. When the magnetic connector ML includes the ferromagnetic material, the magnetic connector ML may have the remanent magnetization due to the magnetic coupling between the magnet coupler MG and the magnetic connector ML. The remanent magnetization of the magnetic connector ML may be formed in a direction for strengthening the magnetic coupling between the magnet coupler MG and the magnetic connector ML.

Directions of magnetic fluxes of the first magnet MG1 and the second magnet MG2 may be different from each other. Therefore, directions of magnetic fluxes of the first magnetic connector ML1 and the second magnetic connector ML2 may be different from each other.

In FIG. 17, (b) illustrates that the second body BD2 is separated from the first body BD1. Namely, the second body BD2 may move in the negative direction of the y-axis based on the first body BD1. When the second body BD2 moves with respect to the first body BD1, the first magnet MG1 may face the second magnetic connector ML2. When the magnetic connector ML includes the ferromagnetic material, a direction of remanent magnetization of the second magnetic connector ML2 may be opposite to a direction of remanent magnetization of the first magnet MG1. In this instance, the first magnet MG1 and the second magnetic connector ML2 may be temporarily repulsed by each other. Hence, the first body BD1 and the second body BD2 may be easily separated from each other.

FIG. 18 illustrates various examples of a disposition of the magnet coupler shown in FIG. 16. The magnet coupler MG may be positioned at an end of the second back cover RC2. A plurality of magnet couplers MG may be provided.

As shown in (a) of FIG. 18, the magnet coupler MG may be positioned on an upper side (i.e., in the positive direction of the y-axis) of the second back cover RC2. When the magnet coupler MG is positioned on the upper side of the second back cover RC2, the magnetic coupling may be provided for the upper side of the second body BD2. Because structural coupling may be provided for a lower side of the second back cover RC2, a coupling force may be provided for the upper side and the lower side of the second back cover RC2. Namely, a position of a force provided for the coupling between the first body BD1 and the second body BD2 may be distributed to the upper side and the lower side of the second body BD2. Thus, the coupling between the first body BD1 and the second body BD2 may be stably maintained.

The magnet coupler MG may include a first magnet MG1, a second magnet MG2, and a third magnet MG3. As shown in (b) of FIG. 18, the first magnet MG1 may be positioned on the upper side of the second back cover RC2, and the second and third magnets MG2 and MG3 may be respectively positioned on the left and right sides of the second back cover RC2, i.e., in substantially parallel with the x-axis. Namely, a position of a force provided for the coupling between the first body BD1 and the second body BD2 may be distributed to the upper, lower, left and right sides of the second body BD2. Thus, the coupling between the first body BD1 and the second body BD2 may be stably maintained.

Figure 19:
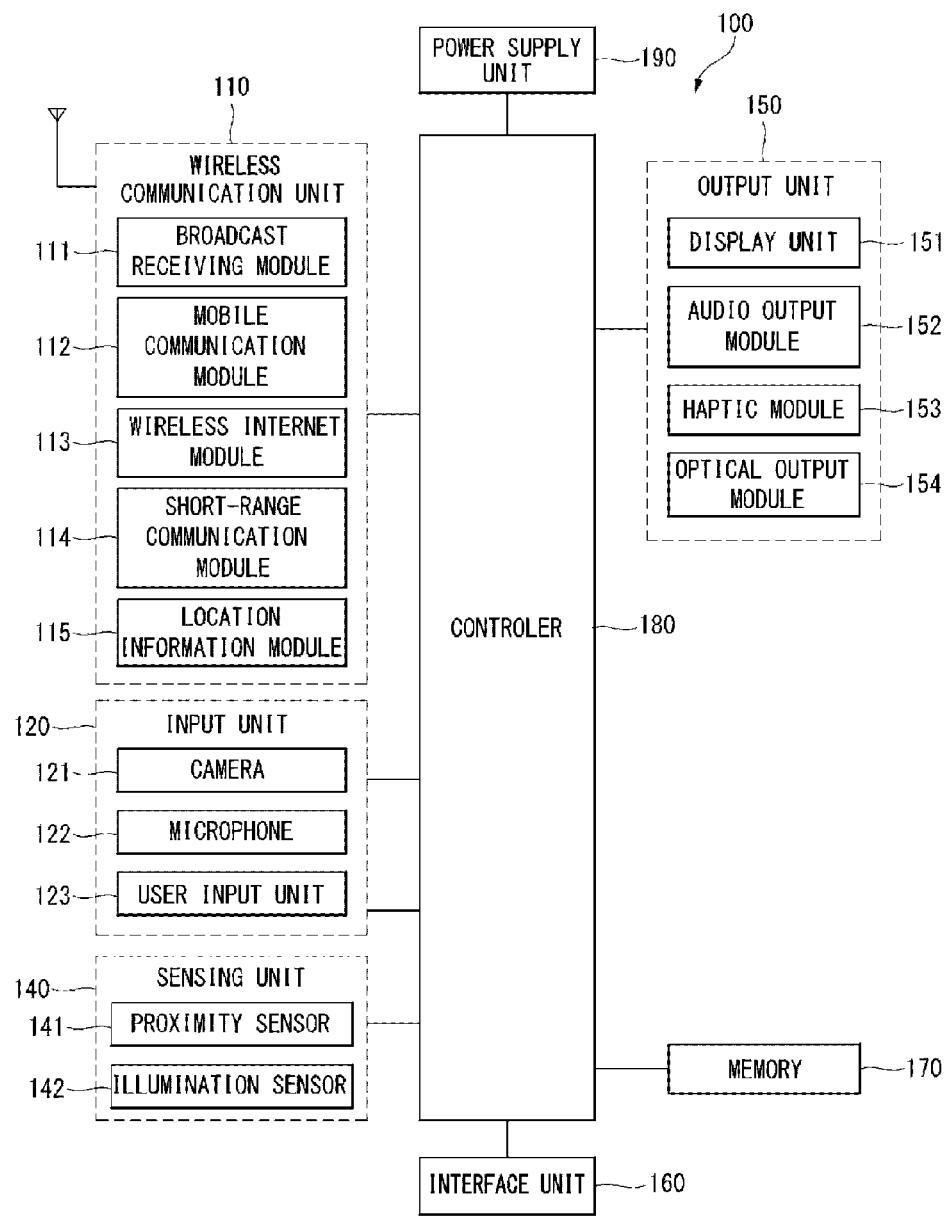
FIG. 19 is a block diagram illustrating a mobile terminal according to an embodiment of the invention.

FIG. 19 is a block diagram of the mobile terminal according to the embodiment of the invention. More specifically, FIG. 19 shows a wireless communication unit 110, an input unit 120, a sensing unit 140, an output unit 150, an interface unit 160, a memory 170, a controller 180, and a power supply unit 190 of the mobile terminal 100.

All of the components shown in FIG. 19 are not a requirement, and that greater or fewer components may be alternatively implemented.

Referring to FIG. 19, the mobile terminal 100 is shown having wireless communication unit 110 configured with several implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 19, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an, interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). The application programs can be stored in the memory 170, installed in the mobile terminal 100, and executed by the controller 180 to perform an operation (or function) for the mobile terminal 100.

The controller 180 controls overall operation of the mobile terminal 100, in addition to the operations associated with the application programs. The controller 180 can provide or process information or functions appropriate for a user by processing signals, data, information and the like, which are input or output by the various components depicted in FIG. 19, or activating application programs stored in the memory 170.

As one example, the controller 180 controls some or all of the components according to the execution of an application program stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a portion of the components illustrated in FIG. 19 may cooperatively operate to implement an operation, a control, or a control method of the mobile terminal 100 according to various embodiments of the invention that will be described below. The operation, the control, or the control method of the mobile terminal 100 may be implemented by the execution of at least one application program stored in the memory 170.

Figure 20:
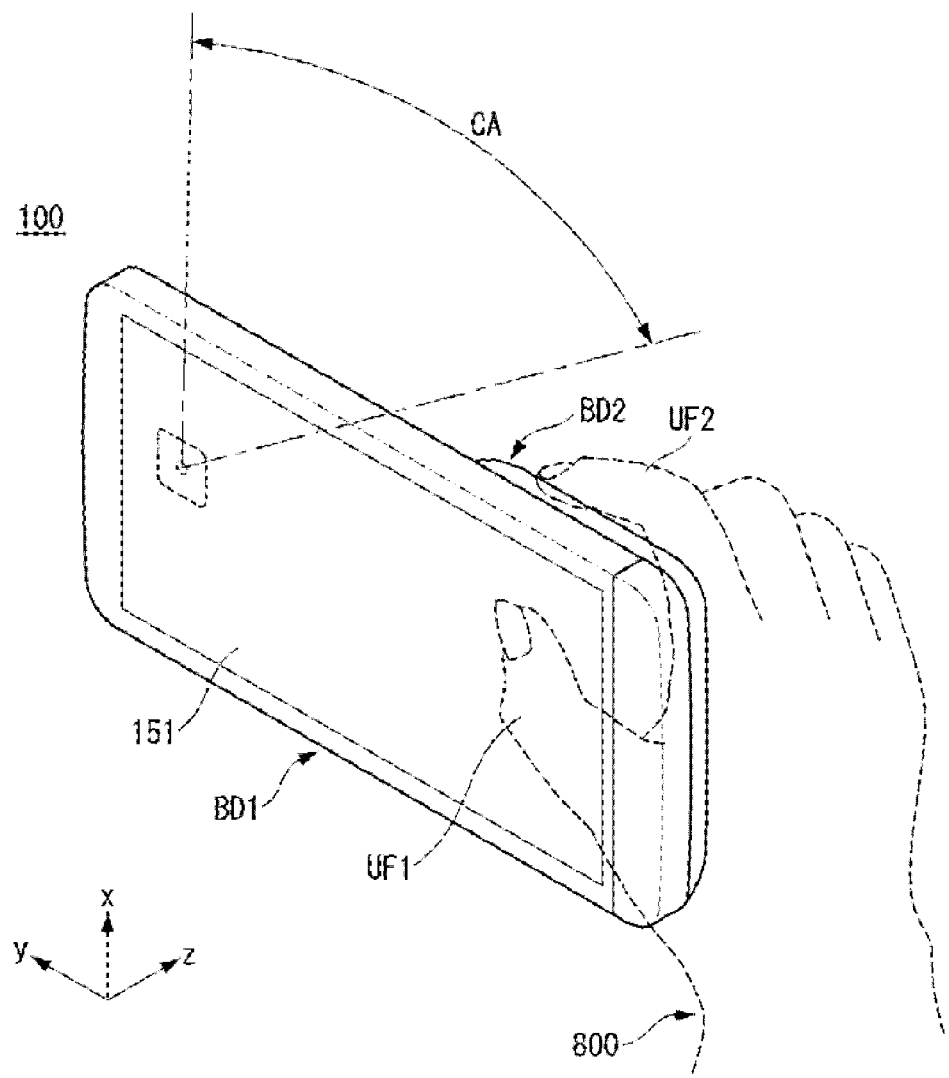
FIG. 20 illustrates the use of a mobile terminal according to an embodiment of the invention.

FIG. 20 illustrates the use of the mobile terminal according to the embodiment of the invention. As shown in FIG. 20, a user 800 may hold the mobile terminal 100 with his/her hand and may take a photo or record a video. The user 800 may use his/her right hand. A thumb UF1 of the user 800 may be naturally placed on the display 151. An index finger UF2 of the user 800 may be naturally placed on the second body BD2. The user 800 may easily press a plurality of buttons formed on the second body BD2 with the index finger UF2. Namely, it is easy for the user 800 to operate the mobile terminal 100 for the use of a camera function of the mobile terminal 100.

An area of the mobile terminal 100 the user 800 contacts may be the lower part of the mobile terminal 100. Namely, the area of the mobile terminal 100 the user 800 contacts may be a formation area of the second body BD2.

The camera 121 (refer to FIG. 1) may be positioned on the upper part of the mobile terminal 100. In FIG. 20, "CA" indicates a viewing angle secured by the camera 121. Because an area of the mobile terminal 100, in which the user 800 is positioned, is separated from an area of the camera 121, the user 800 may be out of a range of the viewing angle CA.

Figure 21:
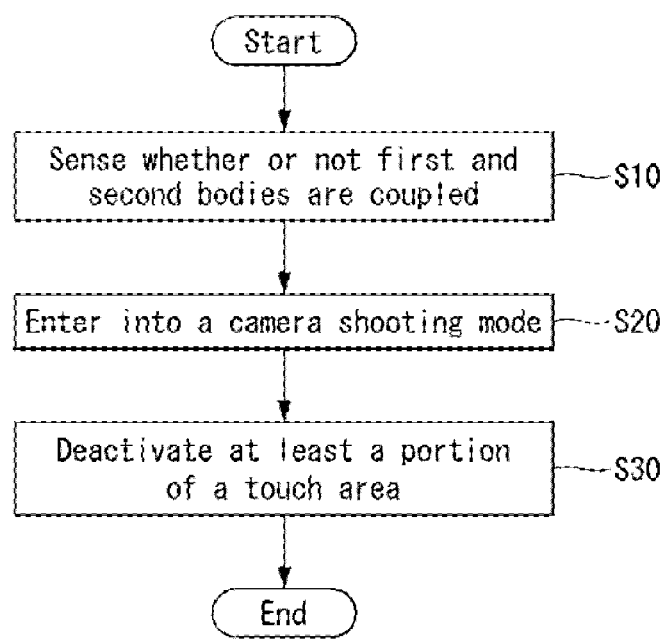
FIG. 21 is a flow chart illustrating a method for operating a mobile terminal according to an embodiment of the invention.

FIG. 21 is a flow chart illustrating a method for operating the mobile terminal according to the embodiment of the invention. The mobile terminal 100 may include the controller 180 (refer to FIG. 19). The controller 180 may sense whether or not the second body BD2 is coupled with the first body BD1. The second body BD2 may make it easy to use a camera function of the mobile terminal 100. The method for operating the mobile terminal may include a step S10 of sensing whether or not the second body BD2 is coupled with the first body BD1.

Namely, the user may couple the second body BD2 with the first body BD1 so as to easily use the camera function of the mobile terminal 100. Thus, the controller 180 may sense whether or not the second body BD2 is coupled with the first body BD1 and may enter a status of the mobile terminal 100 into a camera shooting mode for the convenience of the user. The method for operating the mobile terminal may include a step S20 of entering the mobile terminal 100 into a camera shooting mode.

When the status of the mobile terminal 100 is entered into the camera shooting mode, the mobile terminal 100 may be converted suitable for performing a function of a digital camera. As shown in FIG. 20, the user 800 may touch the display 151 with the thumb UF1 while holding the mobile terminal 100. Because a formation area of the display 151 is an area capable of receiving a user touch input, an unnecessary touch input may be obtained.

Accordingly, a response to a touch input may be deactivated in at least a portion of the display 151. Namely, even if the user touches at least a portion of the display 151, at least a portion of the display 151 may not respond. The method for operating the mobile terminal may include a step S30 of deactivating at least a portion of a touch area. The touch area may indicate an area of the mobile terminal 100, in which a touch input is received.

FIGS. 22 to 27 are figures related to deactivation of a touch area according to the embodiment of the invention.

Figure 22:
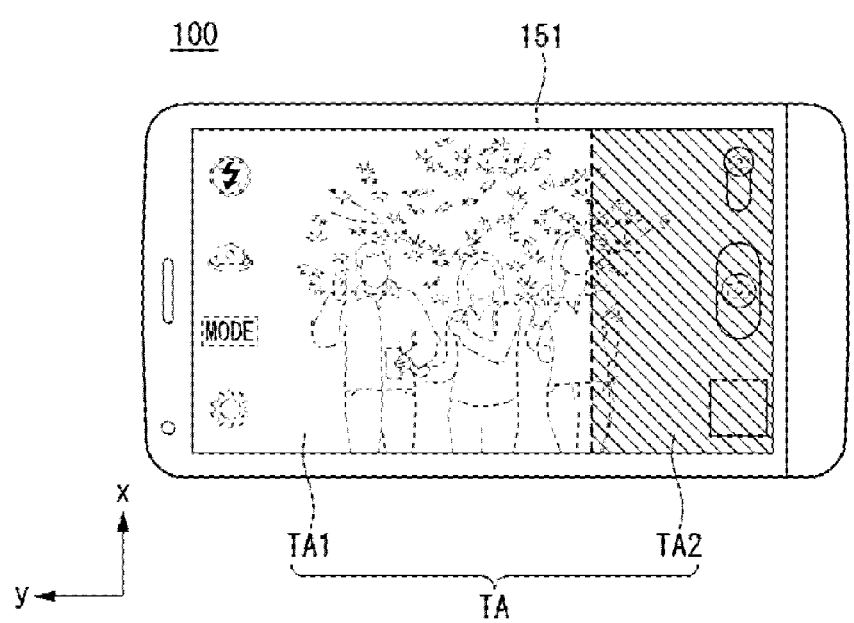
FIGS. 22 to 27 are figures related to deactivation of a touch area in accordance with an embodiment of the invention.

As shown in FIG. 22, a touch area TA may overlap an area of the display 151. Alternatively, the touch area TA may be substantially the same as the area of the display 151.

The touch area TA may include a first touch area TA1 and a second touch area TA2. The first touch area TA1 may be an activated area. Namely, the first touch area TA1 may receive a user's touch input. The first touch area TA1 may be positioned on the upper side (i.e., in the positive direction of the y-axis) of the mobile terminal 100.

The second touch area TA2 may be a deactivated area. Namely, a response to a user's touch input in the second touch area TA2 may be deactivated. The second touch area TA2 may be positioned on the lower side (i.e., in the negative direction of the y-axis) of the mobile terminal 100. The second touch area TA2 may be represented differently from the first touch area TA1. For example, a shade represented in the second touch area TA2 may be different from a shade represented in the first touch area TA1. Thus, the second touch area TA2 may be visually distinguished from the first touch area TA1. The first touch area TA1 and the touch area TA2 may form a boundary line. The boundary line may be substantially parallel to the x-axis.

Figure 23:
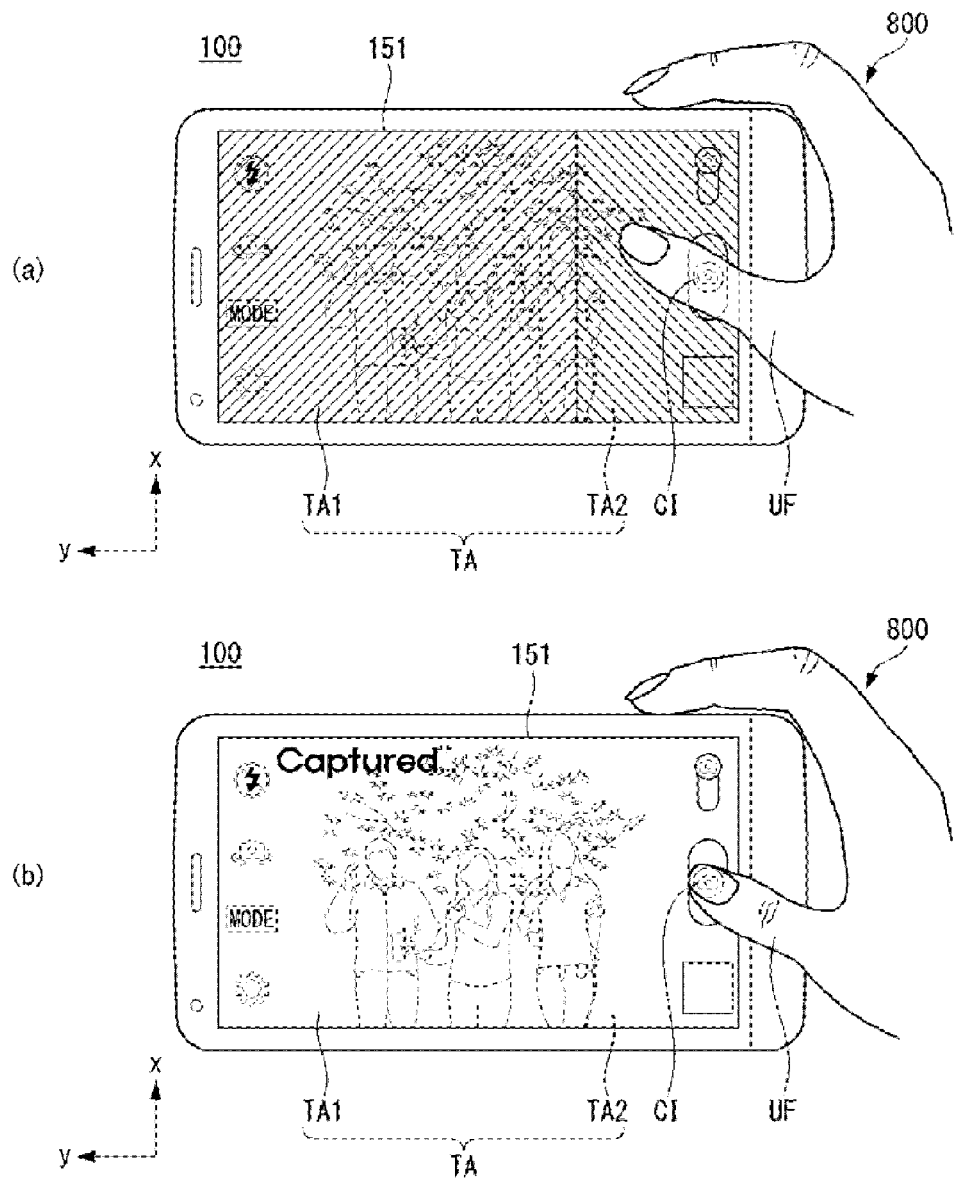

FIG. 23 illustrates whether or not a second touch area is deactivated depending on an area of a touch input in accordance with the embodiment of the invention.

A touch area TA may include a first touch area TA1 and a second touch area TA2. At least one icon may be positioned in the second touch area TA2. For example, a camera icon CI indicating taking photos or recording videos may be positioned in the second touch area TA2.

When a touch input equal to or greater than a determined area is received, the controller 180 may deactivate a response to the touch input. As shown in (a) of FIG. 23, when a user 800 provides a touch input equal to or greater than a determined area for the mobile terminal 100 with his/her finger UF, the controller 180 may deactivate a response to the touch input equal to or greater than the determined area. Thus, even if the user 800 touches the camera icon CI with the finger UF, the controller 180 may deactivate a response to a touch input of the camera icon CI when the touch input of the camera icon CI is equal to or greater than the determined area.

As shown in (b) of FIG. 23, when the user 800 touches the camera icon CI with the finger UF, the controller 180 may activate a response to a touch input of the camera icon CI when the touch input is less than the determined area. As described above, the controller 180 can prevent a malfunction of the mobile terminal 100 resulting from an unintended touch input of the user by deactivating a response to the touch input equal to or greater than the determined area.

Figure 24:
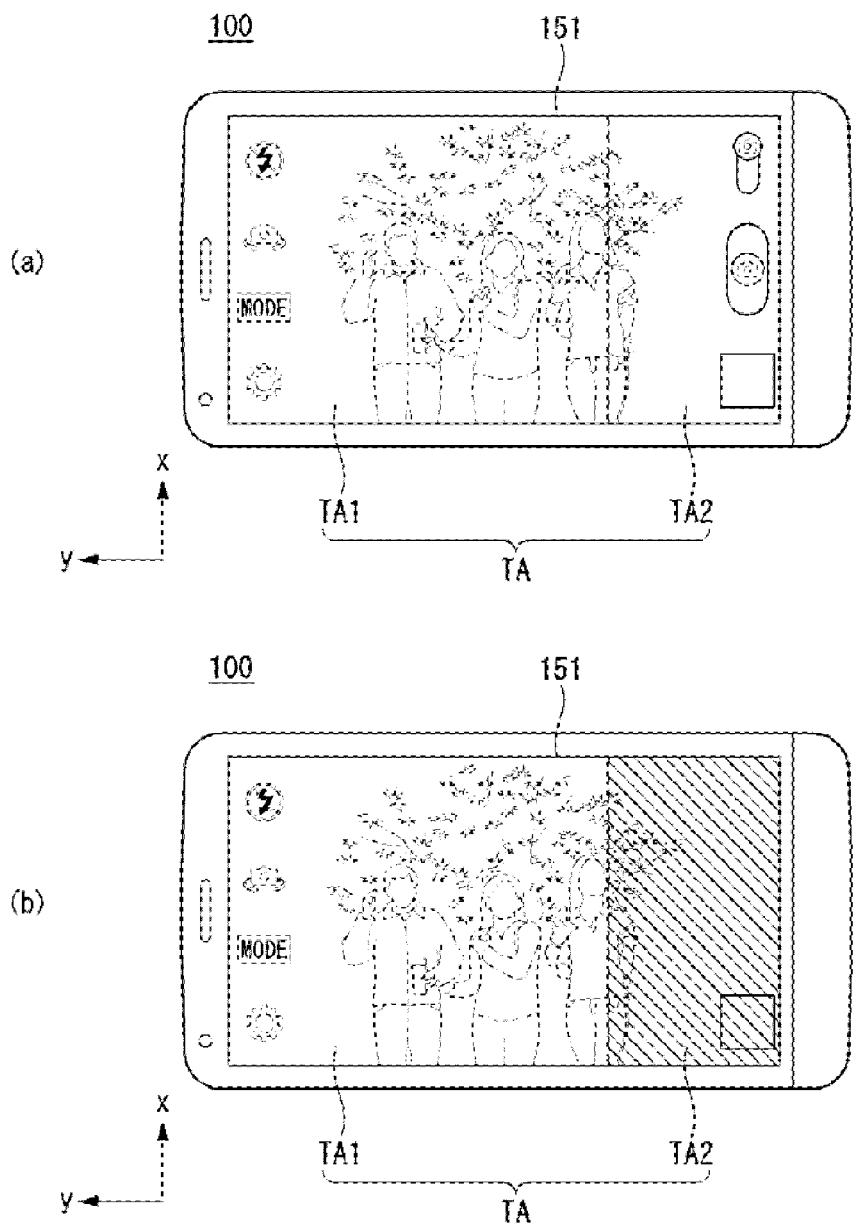

FIG. 24 illustrates that an icon is displayed in a deactivated touch area in accordance with the embodiment of the invention. A touch area TA may include a first touch area TA1 and a second touch area TA2. As shown in (a) of FIG. 24, a plurality of icons may be positioned in the second touch area TA2.

The second touch area TA2 may be deactivated by the controller 180. As shown in (b) of FIG. 24, when the second touch area TA2 is deactivated, a display of at least one of the plurality of icons positioned in the second touch area TA2 may be removed. As described above, as the display of the icon positioned in the second touch area TA2 is removed, a user's intention of touching the deactivated second touch area TA2 may be removed. Further, as shown in (b) of FIG. 24, when the second touch area TA2 is deactivated, the second touch area TA2 may be visually contrasted with the first touch area TA1. For example, when the second touch area TA2 is deactivated, a shade of the second touch area TA2 may be different from a shade of the first touch area TA1.

Figure 25:
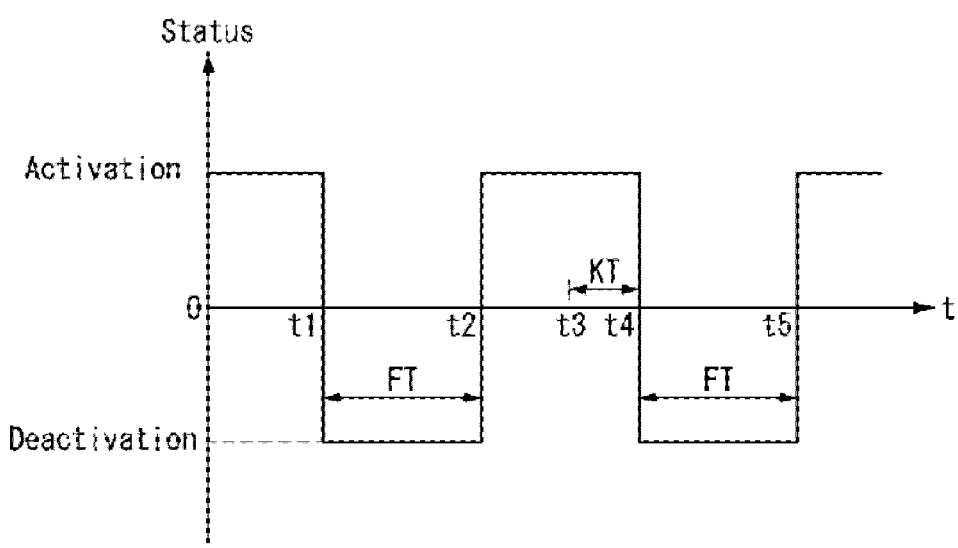

FIG. 25 illustrates a status of a second touch area shown in FIG. 22 depending on time. A status of the second touch area TA2 shown in FIG. 25 may be described in terms of a deactivation status and an activation status. The status of the second touch area TA2 shown in FIG. 25 may be merely an example of the use of the mobile terminal 100.

As shown in FIG. 25, the second touch area TA2 may be in the activation status in an initial stage. When the user provides a touch input equal to or greater than a determined area for the second touch area TA2 at a time T1, the controller 180 may deactivate the second touch area TA2. The above-described touch input equal to or greater than the determined area, that the user provides for the second touch area TA2, may be referred as an unintended touch input of the user, and thus the user convenience can increase by deactivating the second touch area TA2.

After a predetermined time FT passed from the deactivation of the second touch area TA2, the controller 180 may again activate the second touch area TA2. Hence, the user may have other choice capable of making use of the second touch area TA2. At a time T2 after the time FT passed from the time T1, the second touch area TA2 may be activated. The time FT may be a predetermined time.

When the user continuously provides a touch input for the second touch area TA2 for a time KT from a time T3 following the time T2, the controller 180 may deactivate the second touch area TA2. When the touch input is continuously provided for the second touch area TA2 for the determined time KT, the touch input may be referred to as a touch input generated by user's carelessness or an unintended touch input. Thus, in this instance, a deactivation status of the second touch area TA2 may be in accord with a user's intention. A time T4 may be a time after the time KT passed from the time T3. Namely, the second touch area TA2 may be deactivated at the time T4.

A time T5 may be a time after a predetermined time FT passed from the time T4. The controller 180 may again activate the second touch area TA2 at the time T5.

Figure 26:
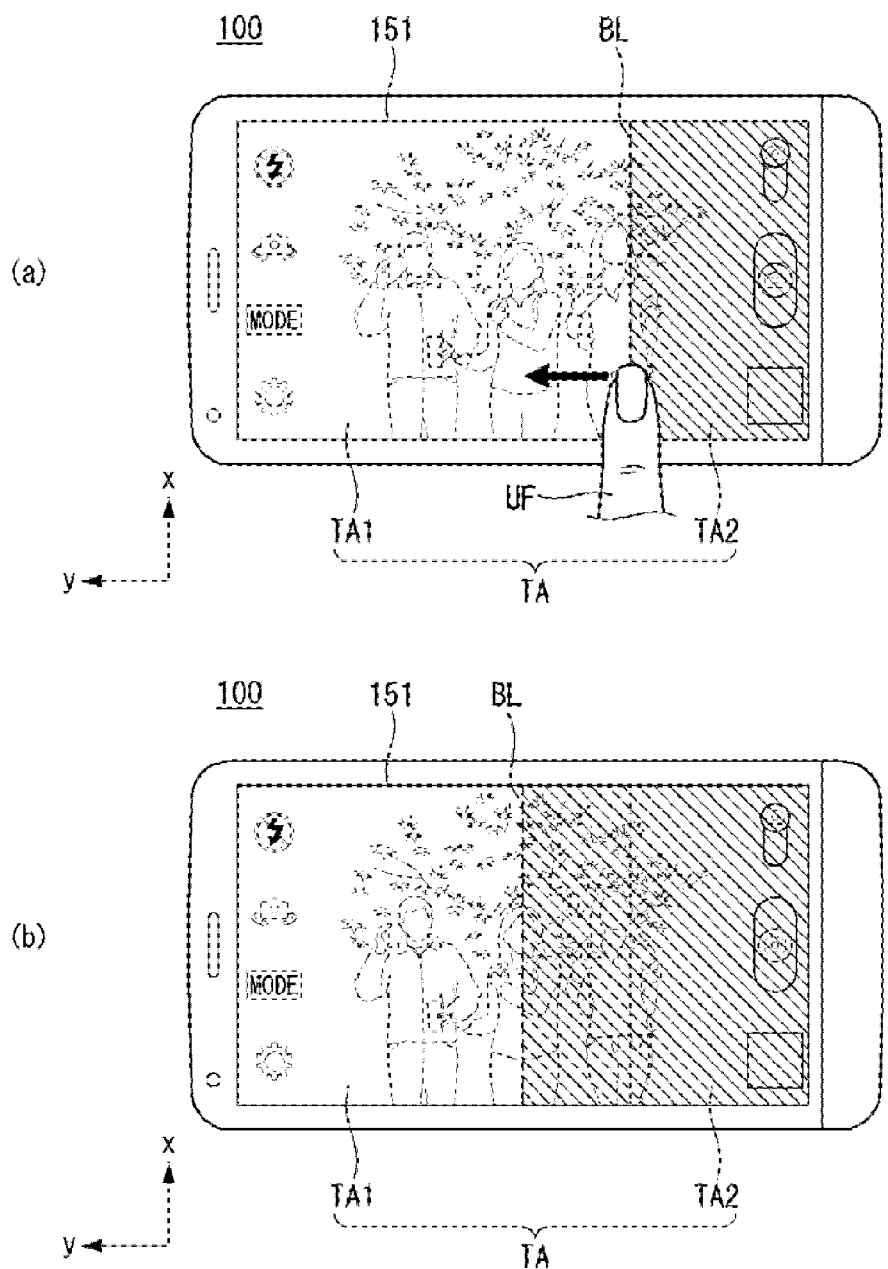

FIG. 26 illustrates that a shape of the second touch area TA2 shown in FIG. 22 is changed by a user's input. The second touch area TA2 may be in a deactivation status. There may be a difference between a shade of the second touch area TA2 and a shade of the first touch area TA1. Namely, a boundary line BL may be formed between the first touch area TA1 and the second touch area TA2 and may be visually displayed.

The users using the mobile terminal 100 may not be the same. For example, a plurality of users may use the mobile terminal 100. The plurality of users may hold the mobile terminal 100 at different positions. Thus, a position or a size of the second touch area TA2 may be required to be changed.

The user may touch the boundary line BL with the finger UF. Namely, as the user touches and moves the boundary line BL with the finger UF, the controller 180 may correspond a position of the boundary line BL to a touch position of the user's finger UF. In other words, the controller 180 may change the position of the boundary line BL by a user's input and may change the position or the size of the second touch area TA2.

Figure 27:
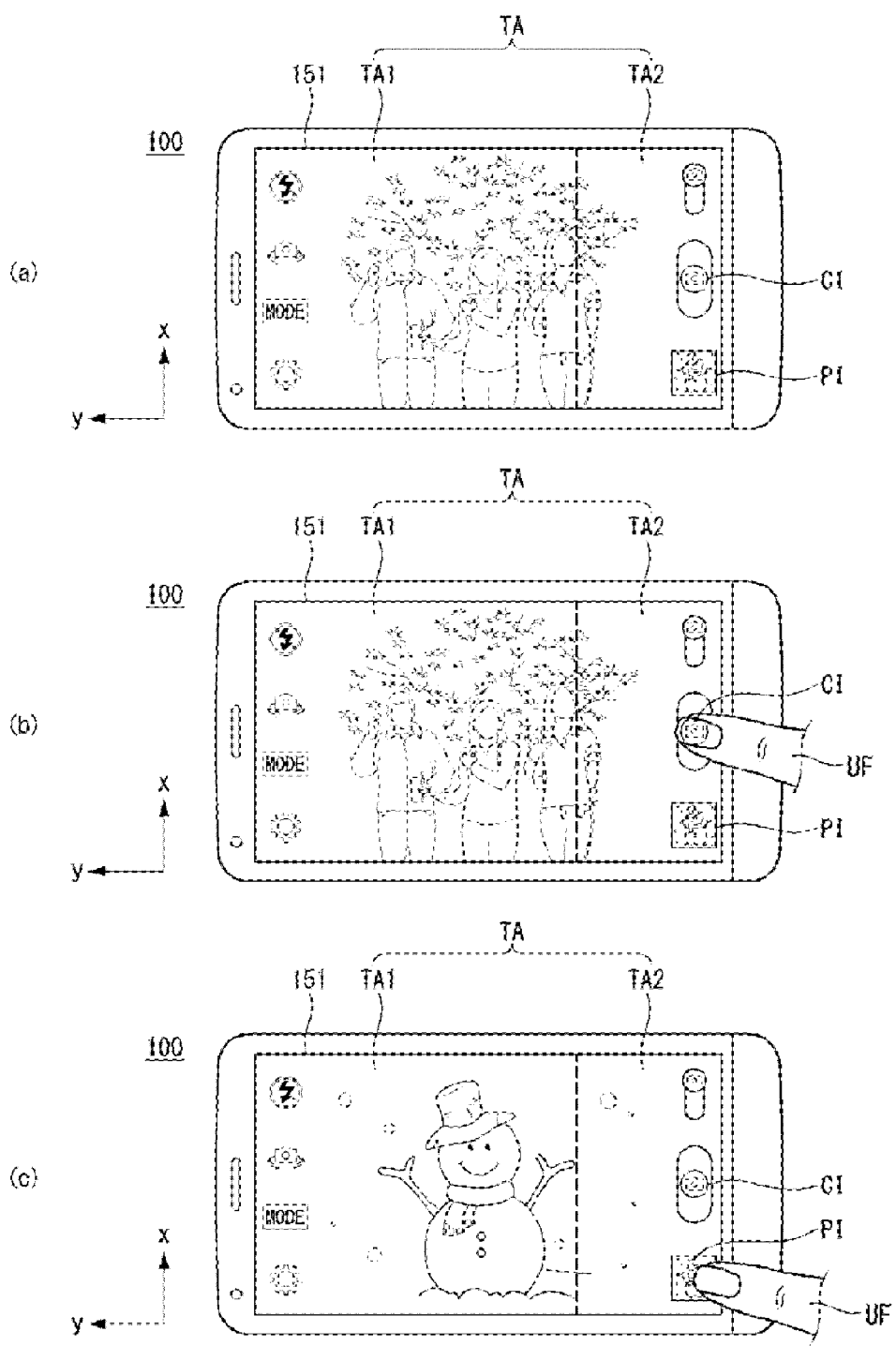

FIG. 27 illustrates that some of a plurality of icons positioned in the second touch area TA2 shown in FIG. 22 maintain an activation status.

The second touch area TA2 may include a plurality of icons. For example, as shown in (a) of FIG. 27, the plurality of icons may include a preview icon PI and a camera icon CI.

A formation area of the camera icon CI may be deactivated. Namely, as shown in (b) of FIG. 27, even if the user touches the camera icon CI with the finger UF, a response to a touch input may be deactivated. When the user uses a camera function of the mobile terminal 100, the user may easily use the function key FK (refer to FIG. 1), etc. Thus, as a response to a touch input of the camera icon CI is deactivated, an unintended touch input of the user can be prevented.

The preview icon PI may be an icon used when the user wants to view again photos taken by the user. The preview icon PI cannot be replaced with the plurality of buttons formed on the second body BD2 (refer to FIG. 1). Thus, the fact that the user touches the preview icon PI may indicate a user's intentional input. As shown in (c) of FIG. 27, when the user touches the preview icon PI, a response to a touch input of the preview icon PI may be activated. Hence, the photos taken by the user may be displayed on the display 151.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a first body having a front surface, on which a display is positioned, one end of the first body being opened; and
    a second body coupled with the first body through a plurality of couplers provided at different positions,
    wherein at least one of the plurality of couplers is a magnet coupler coupling the first and second bodies through a magnetic force,
    wherein at least another of the plurality of couplers is a hook coupler provided corresponding to the first and second bodies,
    wherein the first and second bodies are in one status of a first status in which the second body is coupled with an end of the first body, a second status in which a portion of the second body is separated from the first body, and a third status in which an entire portion of the second body is separated from the end of the first body, and
    wherein the magnet coupler is attached to a back surface of the first body through the magnetic force in the first status.

2. The mobile terminal of claim 1, wherein the second body includes:
    a second body inner part inserted into the first body through the end of the first body; and
    a second back cover extended from the second body inner part toward a back surface of the first body.

3. The mobile terminal of claim 2, wherein the magnet coupler is positioned in at least a portion of the second back cover.

4. The mobile terminal of claim 2, wherein the magnet coupler is positioned at an end of the second back cover.

5. The mobile terminal of claim 2, wherein the second body is coupled with a plurality of members, and
    wherein the plurality of members includes a first member coupled with the second body inner part and a second member coupled with the second back cover.

6. The mobile terminal of claim 5, wherein the first and second members are respectively first and second batteries that are separated from each other.

7. The mobile terminal of claim 1, wherein the magnet coupler includes a first magnet and a second magnet having a polarity different from a polarity of the first magnet, the first and second magnets being arranged side by side.

8. The mobile terminal of claim 1, wherein when the first body is in a first status in which the second body is coupled with the first body, the first body includes a magnetic connector of a metal material in an area corresponding to the magnet coupler so that a coupling force is generated by the magnetic force of the magnet coupler.

9. The mobile terminal of claim 1, wherein the second body includes at least one of a speaker module, an USB module, a plurality of buttons obtaining a push input, and an antenna pattern provided at a location separated from the first body.

10. The mobile terminal of claim 1, wherein at least a portion of a back surface of the first body is formed of a metal material formed as one body together with the first body.

11. A mobile terminal comprising:
    a first body having a front surface, on which a display is positioned, one end of the first body being opened;
    a second body coupled with the first body through a plurality of couplers provided at different positions; and
    a controller configured to deactivate a response to a touch input received from at least a portion of the display when a mode corresponding to a coupling status of the first body and the second body is activated,
    wherein when the touch input includes at least one of a touch equal to or greater than a predetermined area, a touch equal to or greater than a predetermined time, and a touch of at least a predetermined portion of the display, the controller is configured to deactivate the response to the touch input.

12. The mobile terminal of claim 11, wherein the at least the portion of the display is an area of the display contacted by a user's finger holding the second body when the mobile terminal is in a landscape mode.

13. The mobile terminal of claim 11, wherein the at least the portion of the display includes at least one of a left side and a right side of the display.

14. The mobile terminal of claim 11, wherein the controller is configured to distinguishably display the at least the portion of the display and a remaining portion of the display except the at least the portion of the display.

15. The mobile terminal of claim 11, wherein the controller is configured to display a plurality of icons receiving the touch input on the display, and
    wherein when the response to the at least the portion of the display is deactivated, the controller is configured to remove an appearance of at least one icon displayed on the at least the portion of the display among the plurality of icons.

16. The mobile terminal of claim 11, wherein the controller is configured to change a location and an area of the at least the portion of the display in accordance with an input received from a user.

17. The mobile terminal of claim 11, wherein the controller is configured to deactivate the response when the second body is coupled with the first body.

18. The mobile terminal of claim 11, wherein the mode is a camera shooting mode.

* * * * *